(12) United States Patent
Golob et al.

(10) Patent No.: US 12,506,334 B2
(45) Date of Patent: Dec. 23, 2025

(54) SURGE PROTECTIVE DEVICE MODULES AND ASSEMBLIES

(71) Applicant: RAYCAP IP DEVELOPMENT LTD, Nicosia (CY)

(72) Inventors: Peter Golob, Dobrna (SI); Rok Žunič, Ljubljana (SI); Žan Pregelj, Šmartno pri Litiji (SI); Aleš Golob, Ljubljana (SI)

(73) Assignee: RAYCAP IP DEVELOPMENT LTD, Nicosia (CY)

( * ) Notice: Subject to any disclaimer, the term of this patent is extended or adjusted under 35 U.S.C. 154(b) by 422 days.

(21) Appl. No.: 18/147,036

(22) Filed: Dec. 28, 2022

(65) Prior Publication Data

US 2023/0238794 A1    Jul. 27, 2023

Related U.S. Application Data

(60) Provisional application No. 63/302,267, filed on Jan. 24, 2022.

(51) Int. Cl.
*H02H 5/04*        (2006.01)
*H01C 7/12*        (2006.01)
*H01H 37/04*      (2006.01)

(52) U.S. Cl.
CPC ............ *H02H 5/047* (2013.01); *H01C 7/126* (2013.01); *H01H 37/04* (2013.01)

(58) Field of Classification Search
CPC ............ H02H 9/043; H02H 5/04–048; H02H 1/0007; H01H 83/10; H01H 37/04; H01C 7/126

See application file for complete search history.

(56) References Cited

U.S. PATENT DOCUMENTS

| 1,144,029 A | 6/1915 | Creighton |
| 2,158,859 A | 5/1939 | Shinichiro |

(Continued)

FOREIGN PATENT DOCUMENTS

| CH | 466427 A | 12/1968 |
| CN | 106026067 A | 10/2016 |

(Continued)

OTHER PUBLICATIONS

"Overvoltage Protection" ABB Lightning Protection Group (12 pages) (Date unknown but admitted prior art).

(Continued)

*Primary Examiner* — Thienvu V Tran
*Assistant Examiner* — Christopher J Clark
(74) *Attorney, Agent, or Firm* — Myers Bigel, P.A.

(57) ABSTRACT

A surge protective device (SPD) assembly includes a base and an SPD module configured to be mounted on the base. The SPD module includes an SPD module PCB, an SPD module circuit, and a thermal disconnector mechanism. The SPD module circuit is at least partly embodied in the SPD module PCB and includes an overvoltage protection component mounted on the SPD module PCB. The thermal disconnector mechanism is mounted on the SPD module PCB in a ready configuration. The thermal disconnector mechanism is operative to transition from the ready configuration to an actuated configuration responsive to sufficient overheating of the overvoltage protection component. When the thermal disconnector mechanism is positioned in the ready configuration, the SPD circuit forms a first current path through the overvoltage protection component. When the thermal disconnector mechanism is positioned in the actuated configuration, the thermal disconnector mechanism forms an alternate second current path that bypasses the overvoltage protection component.

20 Claims, 29 Drawing Sheets

(56) References Cited

U.S. PATENT DOCUMENTS

| | | |
|---|---|---|
| 2,311,758 A | 2/1943 | Johansson |
| 2,805,294 A | 9/1957 | H |
| 2,971,132 A | 2/1961 | Nash |
| 3,249,719 A | 5/1966 | Misare et al. |
| 3,375,405 A | 3/1968 | Chiffee et al. |
| 3,522,570 A | 8/1970 | Wanaselja |
| 3,711,794 A | 1/1973 | Tasca et al. |
| 3,743,996 A | 7/1973 | Harnden |
| 3,813,577 A | 5/1974 | Kawiecke |
| 4,015,228 A | 3/1977 | Eda et al. |
| 4,023,133 A | 5/1977 | Knapp |
| 4,085,397 A | 4/1978 | Yagher, Jr. |
| 4,092,694 A | 5/1978 | Stetson |
| 4,217,618 A | 8/1980 | Kellenbenz et al. |
| 4,240,124 A | 12/1980 | Westrom |
| 4,241,374 A | 12/1980 | Gilberts |
| 4,249,224 A | 2/1981 | Baumbach |
| 4,288,833 A | 9/1981 | Howell |
| 4,355,345 A | 10/1982 | Franchet |
| 4,425,017 A | 1/1984 | Chan |
| 4,493,003 A | 1/1985 | Mickelson et al. |
| 4,571,656 A | 2/1986 | Ruckman |
| 4,595,635 A | 6/1986 | Dubrow et al. |
| 4,600,261 A | 7/1986 | Debbaut |
| 4,638,284 A | 1/1987 | Levinson |
| 4,701,574 A | 10/1987 | Shimirak et al. |
| 4,906,963 A | 3/1990 | Ackermann et al. |
| 4,908,730 A | 3/1990 | Westrom |
| 4,956,696 A | 9/1990 | Hoppe et al. |
| 5,006,950 A | 4/1991 | Allina |
| 5,130,884 A | 7/1992 | Allina |
| 5,172,296 A | 12/1992 | Kaczmarek |
| 5,311,164 A | 5/1994 | Ikeda et al. |
| 5,519,564 A | 5/1996 | Carpenter |
| 5,523,916 A | 6/1996 | Kaczmarek |
| 5,529,508 A | 6/1996 | Chiotis et al. |
| 5,588,856 A | 12/1996 | Collins et al. |
| 5,621,599 A | 4/1997 | Larsen et al. |
| 5,652,690 A | 7/1997 | Mansfield et al. |
| 5,721,664 A | 2/1998 | Uken et al. |
| 5,724,221 A | 3/1998 | Law |
| 5,781,394 A | 7/1998 | Lorenz et al. |
| 5,808,850 A | 9/1998 | Carpenter |
| 5,936,824 A | 8/1999 | Carpenter |
| 5,990,778 A | 11/1999 | Struempler et al. |
| 6,038,119 A | 3/2000 | Atkins et al. |
| 6,094,128 A | 7/2000 | Bennett et al. |
| 6,172,865 B1 | 1/2001 | Boy et al. |
| 6,175,480 B1 | 1/2001 | Karmazyn |
| 6,222,433 B1 | 4/2001 | Ramakrishnan et al. |
| 6,226,166 B1 | 5/2001 | Gumley et al. |
| 6,430,019 B1 | 8/2002 | Martenson et al. |
| 6,430,020 B1 | 8/2002 | Atkins et al. |
| 6,459,559 B1 | 10/2002 | Christofersen |
| 6,556,402 B2 | 4/2003 | Kizis et al. |
| 6,614,640 B2 | 9/2003 | Richter et al. |
| 6,930,871 B2 | 8/2005 | Macanda |
| 7,433,169 B2 | 10/2008 | Kamel et al. |
| 7,558,041 B2 | 7/2009 | Lagnoux |
| 7,684,166 B2 | 3/2010 | Donati et al. |
| 7,738,231 B2 | 6/2010 | Lagnoux |
| 8,493,170 B2 | 7/2013 | Zaeuner et al. |
| 8,659,866 B2 | 2/2014 | Douglass et al. |
| 8,699,197 B2 | 4/2014 | Douglass et al. |
| 8,743,525 B2 | 6/2014 | Xepapas et al. |
| 9,170,279 B2 | 10/2015 | Bent et al. |
| 9,349,548 B2 | 5/2016 | Juricev |
| 9,355,763 B2 | 5/2016 | Xu |
| 9,570,260 B2 | 2/2017 | Yang et al. |
| 9,634,554 B2 | 4/2017 | Falk et al. |
| 9,906,017 B2 | 2/2018 | Tsovilis et al. |
| 10,629,399 B2 | 4/2020 | Li et al. |
| 10,679,814 B2 | 6/2020 | Vrhunc et al. |
| 11,223,200 B2 | 1/2022 | Tsovilis et al. |
| 2002/0018331 A1 | 2/2002 | Takahashi |
| 2002/0024792 A1 | 2/2002 | Cantagrel |
| 2003/0184926 A1 | 10/2003 | Wu et al. |
| 2004/0150937 A1 | 8/2004 | Bobert et al. |
| 2005/0185356 A1 | 8/2005 | Durth |
| 2005/0231872 A1 | 10/2005 | Schimanski et al. |
| 2006/0245125 A1 | 11/2006 | Aszmus |
| 2006/0291127 A1 | 12/2006 | Kim et al. |
| 2007/0139850 A1 | 6/2007 | Kamel et al. |
| 2007/0217106 A1 | 9/2007 | Lagnoux |
| 2008/0043395 A1 | 2/2008 | Donati et al. |
| 2008/0049370 A1 | 2/2008 | Adachi et al. |
| 2009/0302992 A1 | 12/2009 | Cernicka |
| 2011/0013330 A1 | 1/2011 | Crevenat et al. |
| 2011/0193674 A1 | 8/2011 | Zaeuner et al. |
| 2011/0248816 A1 | 10/2011 | Duval et al. |
| 2012/0050935 A1 | 3/2012 | Douglass et al. |
| 2012/0086539 A1 | 4/2012 | Duval et al. |
| 2012/0086540 A1 | 4/2012 | Duval et al. |
| 2012/0206848 A1 | 8/2012 | Gillespie et al. |
| 2012/0250205 A1 | 10/2012 | Pfitzer et al. |
| 2012/0268850 A1 | 10/2012 | Rainer et al. |
| 2013/0038976 A1 | 2/2013 | Hagerty |
| 2013/0200986 A1 | 8/2013 | Koprivsek |
| 2013/0265685 A1 | 10/2013 | Zauner et al. |
| 2013/0335869 A1 | 12/2013 | Kepapas et al. |
| 2014/0010704 A1 | 1/2014 | Ishida et al. |
| 2014/0092514 A1 | 4/2014 | Chen |
| 2014/0292472 A1 | 10/2014 | Qin et al. |
| 2014/0327990 A1 | 11/2014 | Juricev |
| 2015/0103462 A1 | 4/2015 | Depping |
| 2015/0107972 A1 | 4/2015 | Oh |
| 2015/0270086 A1 | 9/2015 | Chen |
| 2015/0280420 A1 | 10/2015 | Mao |
| 2015/0349523 A1 | 12/2015 | Tsovilis et al. |
| 2015/0372472 A1* | 12/2015 | Gautier .................. H01C 7/126 361/91.2 |
| 2016/0087520 A1 | 3/2016 | Falk et al. |
| 2016/0276821 A1 | 9/2016 | Politis et al. |
| 2017/0110226 A1* | 4/2017 | Hirschmann ............. H01T 1/14 |
| 2017/0311462 A1 | 10/2017 | Kamensek et al. |
| 2018/0138698 A1 | 5/2018 | Tsovilis et al. |
| 2018/0151318 A1 | 5/2018 | Kamensek et al. |
| 2018/0183230 A1 | 6/2018 | Kostakis et al. |
| 2018/0183232 A1 | 6/2018 | Tavcar et al. |
| 2018/0330908 A1 | 11/2018 | Vrhunc et al. |
| 2019/0080826 A1 | 3/2019 | Kamensek et al. |
| 2020/0036185 A1 | 1/2020 | Tsovilis et al. |

FOREIGN PATENT DOCUMENTS

| | | |
|---|---|---|
| CN | 106786465 A | 5/2017 |
| CN | 109525321 A | 3/2019 |
| DE | 1018953 B | 11/1957 |
| DE | 3111096 A1 | 9/1982 |
| DE | 3428258 A1 | 2/1986 |
| DE | 4235329 A1 | 4/1994 |
| DE | 69201021 T2 | 2/1995 |
| DE | 4438593 A1 | 5/1996 |
| DE | 29800372 U1 | 4/1998 |
| DE | 19823446 A1 | 11/1999 |
| DE | 19839422 A1 | 3/2000 |
| DE | 19843519 A1 | 4/2000 |
| DE | 202004006227 U1 | 9/2004 |
| DE | 10323220 A1 | 12/2004 |
| DE | 102005048003 A1 | 4/2007 |
| DE | 102006003274 A1 | 7/2007 |
| DE | 202008004699 U1 | 6/2008 |
| DE | 102007014336 A1 | 10/2008 |
| DE | 102008017423 A1 | 10/2009 |
| DE | 102008026555 A1 | 12/2009 |
| DE | 102012004678 A1 | 9/2013 |
| DE | 202006021210 U1 | 9/2013 |
| DE | 102013103753 A1 | 10/2013 |
| DE | 102013011216 B3 | 10/2014 |
| DE | 102013107807 B3 | 1/2015 |
| DE | 102013021936 B3 | 2/2015 |
| DE | 102014016938 B3 | 2/2016 |
| DE | 102014016830 A1 | 3/2016 |
| DE | 102007030653 B4 | 4/2017 |

(56) References Cited

FOREIGN PATENT DOCUMENTS

| | | |
|---|---|---|
| DE | 102018216015 A1 | 3/2019 |
| DE | 202019102722 U1 | 8/2019 |
| DE | 102018132869 A1 | 6/2020 |
| DE | 102019112680 A1 | 11/2020 |
| DE | 102020202428 A1 | 8/2021 |
| EP | 0108518 A2 | 5/1984 |
| EP | 0203737 A2 | 12/1986 |
| EP | 0335479 A2 | 10/1989 |
| EP | 0445054 A1 | 9/1991 |
| EP | 0462694 A2 | 12/1991 |
| EP | 0516416 A1 | 12/1992 |
| EP | 0603428 A1 | 6/1994 |
| EP | 0785625 A2 | 7/1997 |
| EP | 0963590 A1 | 12/1999 |
| EP | 1094550 A2 | 4/2001 |
| EP | 1102371 A1 | 5/2001 |
| EP | 1116246 A1 | 7/2001 |
| EP | 1148530 A1 | 10/2001 |
| EP | 1355327 A2 | 10/2003 |
| EP | 1458072 A1 | 9/2004 |
| EP | 1798742 A1 | 6/2007 |
| EP | 2075811 A2 | 7/2009 |
| EP | 2201654 A1 | 6/2010 |
| EP | 2707892 A1 | 3/2014 |
| EP | 2725588 A1 | 4/2014 |
| EP | 2284857 B1 | 11/2015 |
| EP | 2953142 A1 | 12/2015 |
| EP | 2954538 A1 | 12/2015 |
| EP | 3001525 A1 | 3/2016 |
| EP | 2954538 B1 | 9/2016 |
| EP | 3240132 A1 | 11/2017 |
| EP | 3055869 B1 | 2/2019 |
| EP | 3460938 A1 | 3/2019 |
| FR | 2574589 A1 | 6/1986 |
| FR | 2622047 A1 | 4/1989 |
| FR | 2897231 A1 | 8/2007 |
| JP | 60-187002 A | 9/1985 |
| JP | S60226103 A | 11/1985 |
| JP | S60258905 A | 12/1985 |
| JP | 61-198701 A | 9/1986 |
| JP | H01176687 A | 7/1989 |
| JP | H05176445 A | 7/1993 |
| JP | 09-326546 | 12/1997 |
| JP | 2002525861 A | 8/2002 |
| JP | 2002525862 A | 8/2002 |
| KR | 101458720 B1 | 11/2014 |
| SI | 9700277 A | 4/1999 |
| SI | 9700332 A | 6/1999 |
| SI | 20781 A | 6/2002 |
| SI | 20782 A | 6/2002 |
| SI | 22030 A | 10/2006 |
| SI | 23303 A | 8/2011 |
| SI | 23749 A | 11/2012 |
| SI | 24371 A | 11/2014 |
| WO | 8800603 A2 | 1/1988 |
| WO | 9005401 A1 | 5/1990 |
| WO | 9515600 A1 | 6/1995 |
| WO | 9524756 A1 | 9/1995 |
| WO | 9742693 A1 | 11/1997 |
| WO | 9838653 A1 | 9/1998 |
| WO | 0017892 A1 | 3/2000 |
| WO | 2007117163 A1 | 10/2007 |
| WO | 2008009507 A1 | 1/2008 |
| WO | 2008104824 A1 | 9/2008 |
| WO | 2011102811 A2 | 8/2011 |
| WO | 2012026888 A1 | 3/2012 |
| WO | 2012154134 A1 | 11/2012 |
| WO | 2013044961 A1 | 4/2013 |
| WO | 2016101776 A1 | 6/2016 |
| WO | 2016110360 A1 | 7/2016 |
| WO | 2021170837 A1 | 9/2021 |

OTHER PUBLICATIONS

"Transient Voltage Surge Suppressors" ABB Inc. (20 pages) (Date unknown but admitted prior art).

Beitz et al. "Chapter 1: Mechanical Design Elements—Component Connections" in Dubbel Taschenbuch für den Maschinenbau (3 pages) (1997).

Data Book Library 1997 Passive Components, Siemens Matsushita Components pp. 15-17, 26-32, 36-37, 39, 161, 166, 167, 169, 171-174 (1997).

DuPont 4300 Series Resistors Technical Data Sheet (3 pages) (May 2013).

FormexTM GK/Formex Product Data Flame Retardant Polypropylene Sheet, ITW Formex (4 pages) (2002).

Oberg et al. "Machinery's Handbook 27th Edition—Soldering and Brazing" (4 pages) (2004).

Raycap "RayvossTM Transient Voltage Surge Suppression System" webpage, http://www.raycap.com/surge/rayvoss.htm accessed on Nov. 29, 2005 (1 page) (Date Unknown; Admitted Prior Art).

Raycap "Revolutionary Lightning Protection Technology" Raycap Corporation Press Release, webpage, http://www.raycap.com/news/020930.htm accessed on Nov. 29, 2005 (1 page) (Date Unknown; Admitted Prior Art).

Raycap "The Ultimate Overvoltage Protection: RayvossTM" brochure (4 pages) (Date Unknown; Admitted Prior Art).

Raycap "Strikesorb® 30 Series OEM Surge Suppression Solutions" brochure (2 pages) (Apr. 17, 2009).

Raycap "The Next Generation Surge Protection Rayvoss™" brochure (4 pages) (May 4, 2012).

Raycap "The Ultimate Overvoltage Protection Rayvoss™" brochure (4 pages) (2005).

Raycap "The Ultimate Overvoltage Protection Rayvoss™" brochure (4 pages) (Jan. 2009).

RayvossTM "The Ultimate Overvoltage Protection" webpage, http://www.rayvoss.com accessed on Nov. 29, 2005 (2 pages) (Date Unknown; Admitted Prior Art).

RayvossTM "Applications" webpage http://www.rayvoss.com/applications.htm accessed on Nov. 29, 2005 (4 pages) (undated).

RayvossTM "Frequently Asked Questions" webpage, http://www.rayvoss.com/faq.htm accessed on Nov. 29, 2005 (2 pages) (Date Unknown; Admitted Prior Art).

RayvossTM "Technical Information" webpage, http://www.rayvoss.com/tech_info.htm accessed on Nov. 29, 2005 (3 pages) (Date Unknown; Admitted Prior Art).

Translation of DIN-Standards, Built-In Equipment for Electrical Installations; Overall Dimensions and Related Mounting Dimensions (15 pages) (Dec. 1988).

U.S. Appl. No. 17/479,356, filed Sep. 20, 2021.

U.S. Appl. No. 17/573,743, filed Jan. 12, 2022.

VAL-MS-T1/T2 335/12.5/3+1, Extract from the online catalog, Phoenix Contact GmbH & Co. KG, http://catalog.phoenixcontact.net/phoenix/treeViewClick.do?UID=2800184 (7 pages) (May 22, 2014).

Partial European Search Report Corresponding to European Application No. 23152520.5 (16 pages) (May 9, 2023).

* cited by examiner

SURGE PROTECTIVE DEVICE MODULES AND ASSEMBLIES

RELATED APPLICATION(S)

The present application claims the benefit of and priority from U.S. Provisional Patent Application No. 63/302,267, filed Jan. 24, 2022, the disclosure of which is incorporated herein by reference.

FIELD OF THE INVENTION

The present invention relates to surge protective devices and, more particularly, to surge protective device modules.

BACKGROUND OF THE INVENTION

Surge protective devices are commonly used to protect data communications lines from excess voltage or current spikes.

SUMMARY

According to some embodiments, a surge protective device (SPD) assembly includes a base and an SPD module configured to be mounted on the base. The SPD module includes an SPD module printed circuit board (PCB), an SPD module circuit, and a thermal disconnector mechanism. The SPD module circuit is at least partly embodied in the SPD module PCB and includes an overvoltage protection component mounted on the SPD module PCB. The thermal disconnector mechanism is mounted on the SPD module PCB. The thermal disconnector mechanism is mounted on the SPD module PCB in a ready configuration. The thermal disconnector mechanism is operative to transition from the ready configuration to an actuated configuration responsive to sufficient overheating of the overvoltage protection component. When the thermal disconnector mechanism is positioned in the ready configuration, the SPD circuit forms a first current path through the overvoltage protection component. When the thermal disconnector mechanism is positioned in the actuated configuration, the thermal disconnector mechanism forms an alternate second current path that bypasses the overvoltage protection component.

According to some embodiments, the thermal disconnector mechanism includes first and second electrically conductive bypass contacts mounted on the SPD module PCB and connected to the SPD module circuit, and the thermal disconnector mechanism includes a thermal actuator including a switch member. The switch member includes an electrically conductive portion. The thermal disconnector mechanism is transitioned from the ready configuration to the actuated configuration by displacing the switch member is movable from a ready position to a displaced position to thereby transition the thermal disconnector mechanism from the ready configuration to the actuated configuration. In the ready configuration, the electrically conductive portion does not electrically connect the first and second bypass contacts. When the thermal disconnector mechanism is positioned in the actuated configuration, the switch member is in the displaced position and the electrically conductive portion contacts and electrically connects the first and second bypass contacts to form the alternate second current path through the electrically conductive portion and the first and second bypass contacts that bypasses the overvoltage protection component.

In some embodiments, the first bypass contact is an electrically conductive first pin mounted on the SPD module PCB, and the second bypass contact is an electrically conductive second pin mounted on the SPD module PCB.

In some embodiments, the switch member includes a body formed of an electrically insulating material, and the electrically conductive portion is a layer of an electrically conductive material.

According to some embodiments, the switch member is loaded to move from the ready position to the displaced position, the switch member is held in the ready position by solder, and the solder is configured to be melted by heat from the overvoltage protection component to thereby release the switch member into the displaced position.

In some embodiments, the SPD module circuit includes first and second contact pads on the SPD module PCB, and the switch member includes a second electrically conductive portion. The solder is located on the first and second contact pads and secures the second electrically conductive portion to the first and second contact pads. The second electrically conductive portion electrically connects the first and second contact pads when the thermal disconnector mechanism is in the ready configuration and does not electrically connect the first and second contact pads when the thermal disconnector mechanism is in the actuated configuration.

According to some embodiments, the SPD module circuit includes first and second contact pads on the SPD module PCB, and the switch member includes a second electrically conductive portion that electrically connects the first and second contact pads when the thermal disconnector mechanism is in the ready configuration and does not electrically connect the first and second contact pads when the thermal disconnector mechanism is in the actuated configuration.

According to some embodiments, the switch member translates from the ready position to the displaced position.

In some embodiments, the SPD module includes a displaceable indicator member, and the translation of the switch member from the ready position to the displaced position forces the indicator member to translate from a ready position to an indicating position.

In some embodiments, the SPD module includes a displaceable indicator member, and the translation of the switch member from the ready position to the displaced position forces the indicator member to rotate from a ready position to an indicating position.

According to some embodiments, the base includes a base module that includes: a base module housing; an input cable connector and an output cable connector on the housing; at least one base connector on the housing; and a base module circuit electrically connecting the input cable connector to the output cable connector, and electrically connecting the input cable connector and the output cable connector to the at least one base connector. The SPD module is configured to be mounted on the base module. The SPD module includes an SPD module housing, and at least one SPD module connector configured to electrically contact the at least one base connector when the SPD module is mounted on the base module and to thereby electrically connect the base module circuit to the SPD module circuit to form an SPD circuit. The first current path extends from the input cable connector to the output cable connector through the overvoltage protection component. The second current path extends from the input cable connector to the output cable connector through the SPD module circuit and bypasses the overvoltage protection component.

In some embodiments, the base module includes a disconnecting mechanism including an actuator member; and the actuator member is selectively operable by a user to electrically disconnect the input cable connector from the output cable connector.

In some embodiments, the disconnecting mechanism includes a switch, and the actuator member is selectively operable by a user to electrically disconnect the input cable connector from the output cable connector via the switch.

In some embodiments, the at least one SPD module connector includes a blade connector.

According to some embodiments, the at least one base connector includes first and second opposed base spring contacts, the blade connector has a first side edge and a laterally opposing second side edge, wherein the first and second side edges are spaced apart along a lateral axis, and the blade connector includes: a blade tab forming a part of the SPD module PCB; a first electrical contact layer disposed on the blade tab along the first side edge; and a second electrical contact layer on the blade tab along the second side edge. The at least one base connector is configured to receive the blade connector such that the first and second base spring contacts engage the first and second electrical contact layers, respectively, and load the first and second side edges along the lateral axis.

In some embodiments, the first base contact is a spring contact, and when the blade connector is received in the base connector, the spring contact is elastically deflected and applies a load against the first side edge along the lateral axis.

In some embodiments, the base connector is configured such that the first and second base contacts electrically engage one another when blade connector is not installed in the base connector.

In some embodiments, the first and second base contacts and the blade connector include cooperating interlock features that mechanically resist removal of the blade connector from the base connector.

In some embodiments, the first and second side edges are narrow side edges.

According to some embodiments, a surge protective device (SPD) module includes an SPD module printed circuit board (PCB), an SPD module circuit, and a thermal disconnector mechanism. The SPD module circuit is at least partly embodied in the SPD module PCB and includes an overvoltage protection component mounted on the SPD module PCB. The thermal disconnector mechanism is mounted on the SPD module PCB. The thermal disconnector mechanism is mounted on the SPD module PCB in a ready configuration. The thermal disconnector mechanism is operative to transition from the ready configuration to an actuated configuration responsive to sufficient overheating of the overvoltage protection component. When the thermal disconnector mechanism is positioned in the ready configuration, the SPD circuit forms a first current path through the overvoltage protection component. When the thermal disconnector mechanism is positioned in the actuated configuration, the thermal disconnector mechanism forms an alternate second current path that bypasses the overvoltage protection component.

According to some embodiments, a surge protective device (SPD) assembly includes a base and an SPD module. The base includes a base connector. The base connector includes first and second opposed base contacts. The SPD module is configured to be mounted on the base. The SPD module includes an SPD module printed circuit board (PCB), an SPD module circuit, and a blade connector. The SPD module circuit includes an overvoltage protection component. The blade connector has a first side edge and a laterally opposing second side edge. The first and second side edges are spaced apart along a lateral axis. The blade connector includes a blade tab forming a part of the SPD module PCB, a first electrical contact layer disposed on the blade tab along the first side edge, and a second electrical contact layer on the blade tab along the second side edge. The base connector is configured to receive the blade connector such that the first and second base contacts engage the first and second electrical contact layers, respectively, and the first and second base contacts are loaded against the first and second side edges along the lateral axis.

According to some embodiments, the first base contact is a spring contact and, when the blade connector is received in the base connector, the spring contact is elastically deflected and applies a load against the first side edge along the lateral axis.

In some embodiments, the base connector is configured such that the first and second base contacts electrically engage one another when blade connector is not installed in the base connector.

In some embodiments, the SPD module circuit is at least partly embodied in the SPD module PCB, and the overvoltage protection component is mounted on the SPD module PCB According to some embodiments, the first and second base contacts and the blade connector include cooperating interlock features that mechanically resist removal of the blade connector from the base connector.

In some embodiments, the first and second side edges are narrow side edges.

According to some embodiments, a surge protective device (SPD) assembly includes a base module and an SPD module. The base module includes a base module housing, an input cable connector and an output cable connector on the housing, at least one base connector on the housing, a base module circuit, and a disconnecting mechanism. The base module circuit electrically connects the input cable connector to the output cable connector, and electrically connects the input cable connector and the output cable connector to the at least one base connector. The disconnecting mechanism includes a switch and an actuator member. The actuator member is selectively operable by a user to electrically disconnect the input cable connector from the output cable connector via the switch. The SPD module is configured to be mounted on the base module. The SPD module includes an SPD module housing, an SPD module circuit including an overvoltage protection component, and at least one SPD module connector configured to electrically contact the at least one base connector when the SPD module is mounted on the base module and to thereby electrically connect the base module circuit to the SPD module circuit to form an SPD circuit.

According to some embodiments, the disconnecting mechanism includes a switch, and the actuator member is selectively operable by a user to electrically disconnect the input cable connector from the output cable connector via the switch.

In some embodiments, the base module circuit includes a second overvoltage protection component.

According to some embodiments, a surge protective device (SPD) assembly includes an input cable connector, an output cable connector, a disconnecting mechanism, an overvoltage protection component, and a thermal disconnector mechanism. The disconnecting mechanism includes an actuator member. The actuator member is selectively operable by a user to electrically disconnect the input cable connector from the output cable connector. The thermal disconnector mechanism is in a ready configuration. The thermal disconnector mechanism is operative to transition from the ready configuration to an actuated configuration responsive to overheating of the overvoltage protection component. The SPD assembly forms a first current path through the overvoltage protection component when the thermal disconnector mechanism is positioned in the ready configuration. The SPD assembly forms an alternate second current path bypassing the overvoltage protection component when the thermal disconnector mechanism is positioned in the actuated configuration.

According to some embodiments, the disconnecting mechanism includes a switch, and the actuator member is selectively operable by a user to electrically disconnect the input cable connector from the output cable connector via the switch.

In some embodiments, the SPD assembly includes a base and an SPD module configured to be mounted on the base, the base includes at least one base connector, and the SPD module includes at least one SPD module connector configured to electrically contact the at least one base connector when the SPD module is mounted on the base.

According to some embodiments, a surge protective device (SPD) assembly comprises: a plurality of SPD modules, each of the SPD modules having a window formed therein and the plurality of SPD modules being arranged, such that the windows formed therein, respectively, are axially aligned in a row; a transmitter assembly in a first one of the plurality of SPD modules at a first end of the row, the transmitter assembly being configured to transmit optical radiation through the windows formed in the plurality of SPD modules; a receiver assembly in a second one of the plurality of SPD modules at a second end of the row, the receiver assembly being configured to receive the optical radiation transmitted by the transmitter assembly; wherein the transmitter assembly is further configured to transmit a plurality of encoded messages via the optical radiation; and wherein the receiver assembly is configured to decode the plurality of encoded messages and to generate a notification indicating which of a plurality of states the surge protective device is in based on the decoding of the plurality of encoded messages.

In other embodiments, the plurality of states comprises none of the plurality of SPD modules have activated; at least one of the plurality of SPD modules has activated; and secondary optical radiation from a secondary source has penetrated the plurality of windows of the plurality of SPD modules.

In still other embodiments, each of the plurality of encoded messages comprises at least one bit and corresponds to a respective one of a plurality of known codewords; wherein the receiver assembly is further configured to compare each of the decoded messages with a corresponding one of the plurality of known codewords; and the receiver assembly is further configured to generate the notification based on comparing the plurality of decoded messages with the plurality of known codewords, respectively.

In still other embodiments, the receiver assembly is further configured to determine a number of bits that differ between the plurality of decoded messages and the plurality of known codewords, respectively, based on the comparing the plurality of decoded messages with the plurality of known codewords, respectively.

In still other embodiments, the plurality of known codewords has a plurality of bit thresholds associated therewith, respectively; and the receiver assembly is further configured to generate the notification that the surge protective device is in the none of the plurality of SPD modules have activated state when the number of bits that differ between the plurality of decoded messages and the plurality of known codewords, respectively, is less than the plurality of bit thresholds, respectively.

In still other embodiments, the plurality of known codewords has a plurality of bit thresholds associated therewith, respectively; and the receiver assembly is further configured to generate the notification that the surge protective device is in the at least one of the plurality of SPD modules has activated state when the number of bits that differ between at least one of the plurality of decoded messages and at least one of the plurality of known codewords, respectively, is not less than the plurality of bit thresholds, respectively.

In still other embodiments, the receiver assembly is further configured to generate the notification that the surge protective device is in the secondary optical radiation from the secondary source has penetrated the plurality of windows state when a number of consecutive bits in at least one of the plurality of decoded messages exceeds a repeating bit threshold.

In still other embodiments, the plurality of encoded messages comprises three encoded messages; a first one of the plurality of encoded messages comprises N bits, a second one of the plurality of encoded messages comprises 2N bits, and a third one of the plurality of encoded messages comprises 3N bits; and N is a positive integer.

In still other embodiments, the transmitter assembly is further configured to transmit each of the plurality of encoded messages at a frequency of about 40 bits/sec.

In still other embodiments, the transmitter assembly is further configured to delay about 5 seconds between transmitting respective ones of the plurality of encoded messages

BRIEF DESCRIPTION OF THE DRAWINGS

The accompanying drawings, which form a part of the specification, illustrate embodiments of the present invention.

DETAILED DESCRIPTION OF EMBODIMENTS OF THE INVENTION

Figure 1:
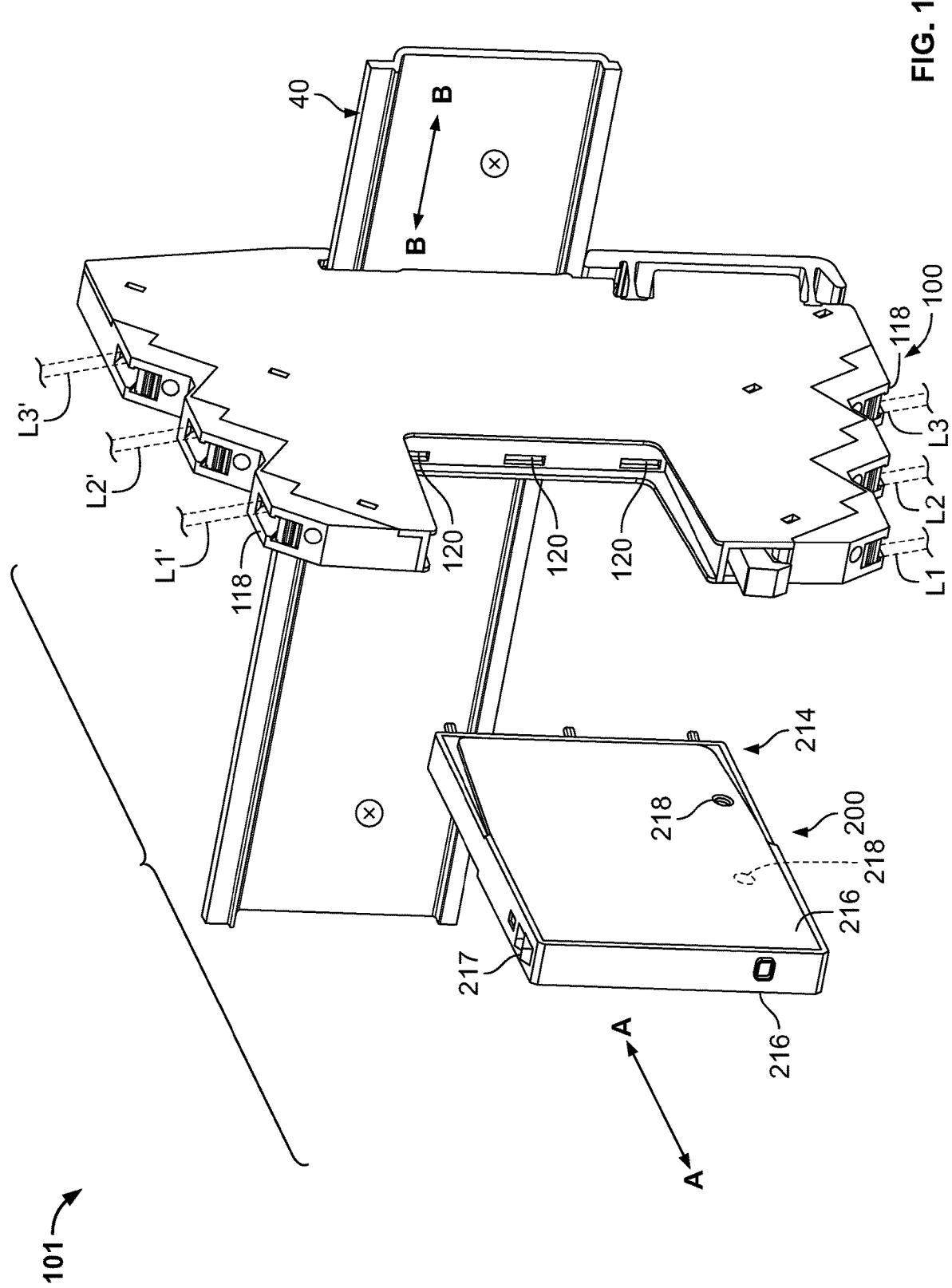
FIG. 1 is an exploded, perspective view of an SPD assembly according to some embodiments mounted on a DIN rail.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term a data processing system may include, but it is not limited to, a hardware element, firmware component, and/or software component.

As used herein, "monolithic" means an object that is a single, unitary piece formed or composed of a material without joints or seams. Alternatively, a unitary object can be a composition composed of multiple parts or components secured together at joints or seams.

Embodiments of the inventive concept are described herein with respect to surge protection for data communication cables. A "data communication cable" as used herein means any kind of medium configured to carry an electrical transmission signal, which is transmitted between two locations. The electrical transmission signal may embody binary data either directly and/or through modulation techniques, which are represented as a sequence of ones and zeros. Data communication cables may include, but are not limited to, twisted pair cables, coaxial cables, peripheral cables, e.g., USB, networking cables, e.g, Ethernet, and inner communication cables, e.g., cables between hardware elements in a computer system.

Referring to FIGS. 1-22, a surge protective device (SPD) assembly 101 according to some embodiments of the inventive concept is shown therein. The SPD assembly 101 is modular and includes an SPD module 200 and a pedestal or base module 100. The SPD module 200 is pluggable into and removable from the base module 100. The SPD module 200 can be individually removed and replaced in the event an electrical component of the SPD module 200 fails.

The SPD assembly 101 embodies an SPD circuit EA (FIG. 3) according to some embodiments including a base module circuit EB and an SPD module circuit EM. The SPD assembly 101 is adapted to receive and electrically connect input lines or cables L1, L2, L3 and output lines or cables L1', L2', L3' with the base module circuit EB, and also with the SPD module circuit EM when the SPD module 200 is installed in the base module 100. The SPD assembly 101 is also adapted to connect the SPD circuit EA to electrical ground GND. In some embodiments, the SPD assembly 101 connects the SPD circuit EA to electrical ground GND through a support rail 40. The SPD circuit EA, the base module circuit EB and the SPD module circuit EM as illustrated and described are example circuits and other circuit configurations may be provided instead in accordance with embodiments of the technology.

In some embodiments, the SPD assembly 101 is used to transmit electrical data communications signals. In some embodiments, the input cables L1, L2 are electrical data communications or signal input cables, and the output cables L1', L2' are corresponding data communications or signal output cables. The cables L1, L2, L1', L2' may include insulated wires.

Figure 23:
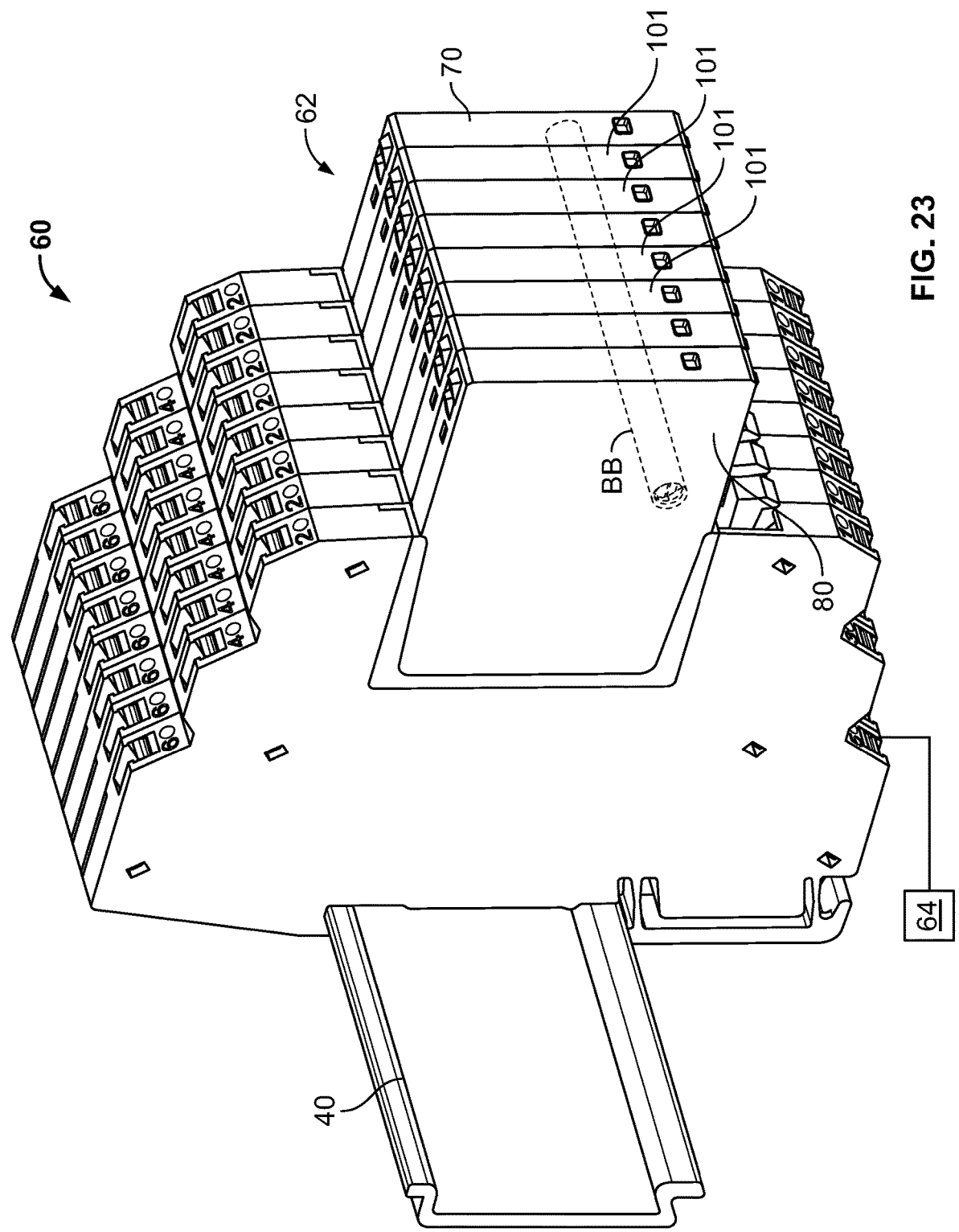
FIG. 23 is a perspective view of a data signal SPD system according to further embodiments.

The SPD assembly 101 may be operatively combined with an optical monitoring system to monitor a state of the SPD assembly 101. For example, the SPD assembly 101 may be used in a monitored SPD system 60 (FIG. 23). The monitored SPD system 60 includes an optical monitoring system 62 including an optical transmitter 70, an optical receiver 80, and a remote monitoring device 64.

The illustrated SPD assembly 101 is configured to be mounted on a DIN rail 40. However, other mounting and protection configurations may be provided in accordance with some embodiments of the technology.

According to some embodiments and as shown, the SPD assembly 100 is configured, sized and shaped for mounting on a support rail 40. According to some embodiments, the support rail 40 is a DIN (Deutsches Institut für Normung e.V.) rail shown in FIG. 1 and is compliant with corresponding applicable DIN requirements or standards. According to some embodiments, the support rail 40 is a DIN top hat rail having a width of 35 mm and a depth of 7.5 mm. The DIN rail 40 has a lengthwise axis B-B. The DIN rail 40 may be secured (e.g., by screws or other fasteners) to a suitable support structure such as a wall, for example, a rear wall of an electrical service utility cabinet. The base module 100 is removably mountable on the DIN rail 40. The pluggable SPD module 200 is in turn removably mountable on the base module 100.

In some embodiments, the maximum dimensions of the SPD assembly 101 are compliant with DIN (Deutsches Institut für Normung e.V.) Standard: DIN EN 60715:2017.

In some embodiments, the maximum dimensions of the assembly 100 are compliant with each of these standards.

Figure 4:
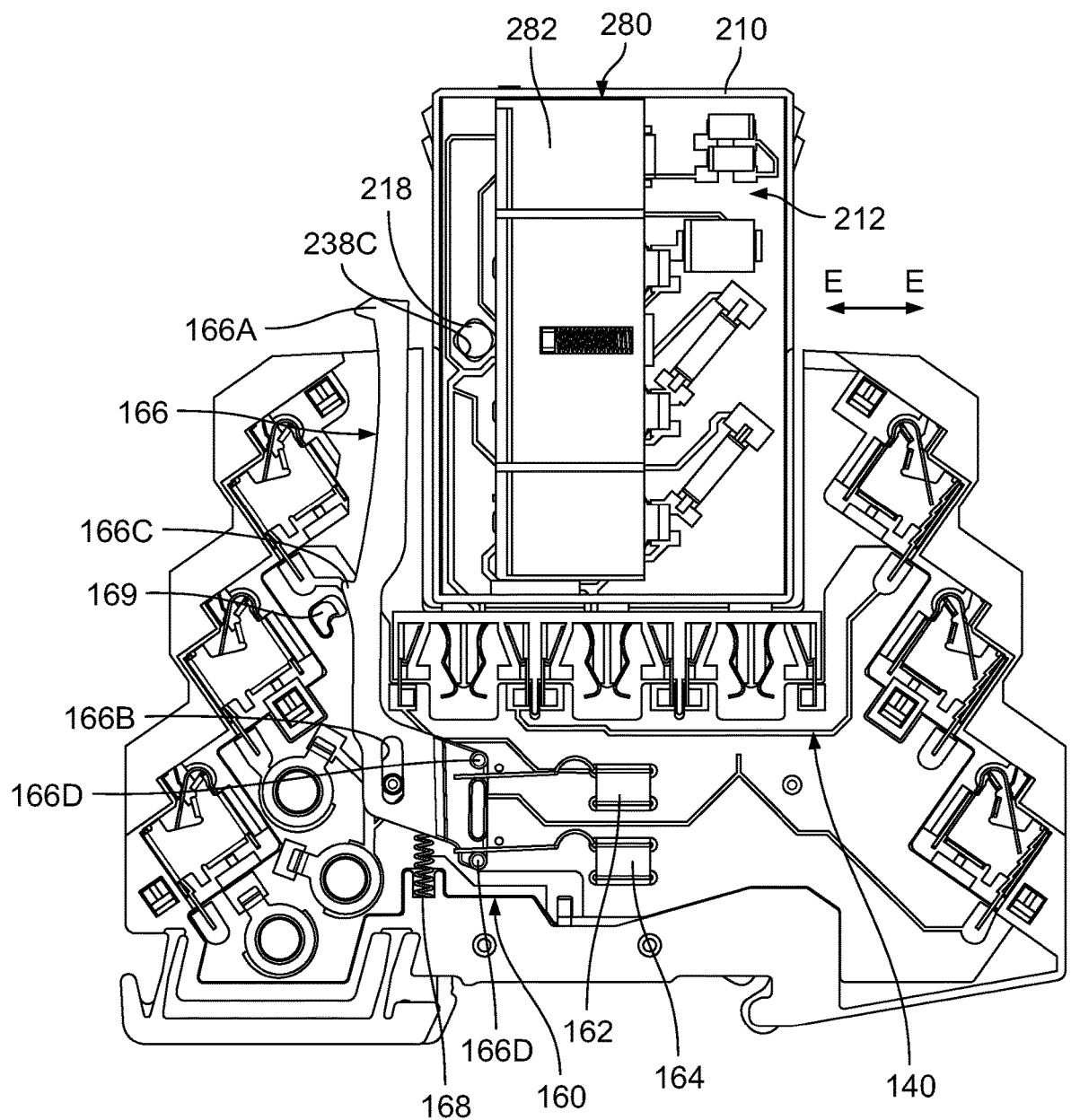
FIG. 4 is a fragmentary, side view of the SPD assembly of FIG. 1.
Figure 5:
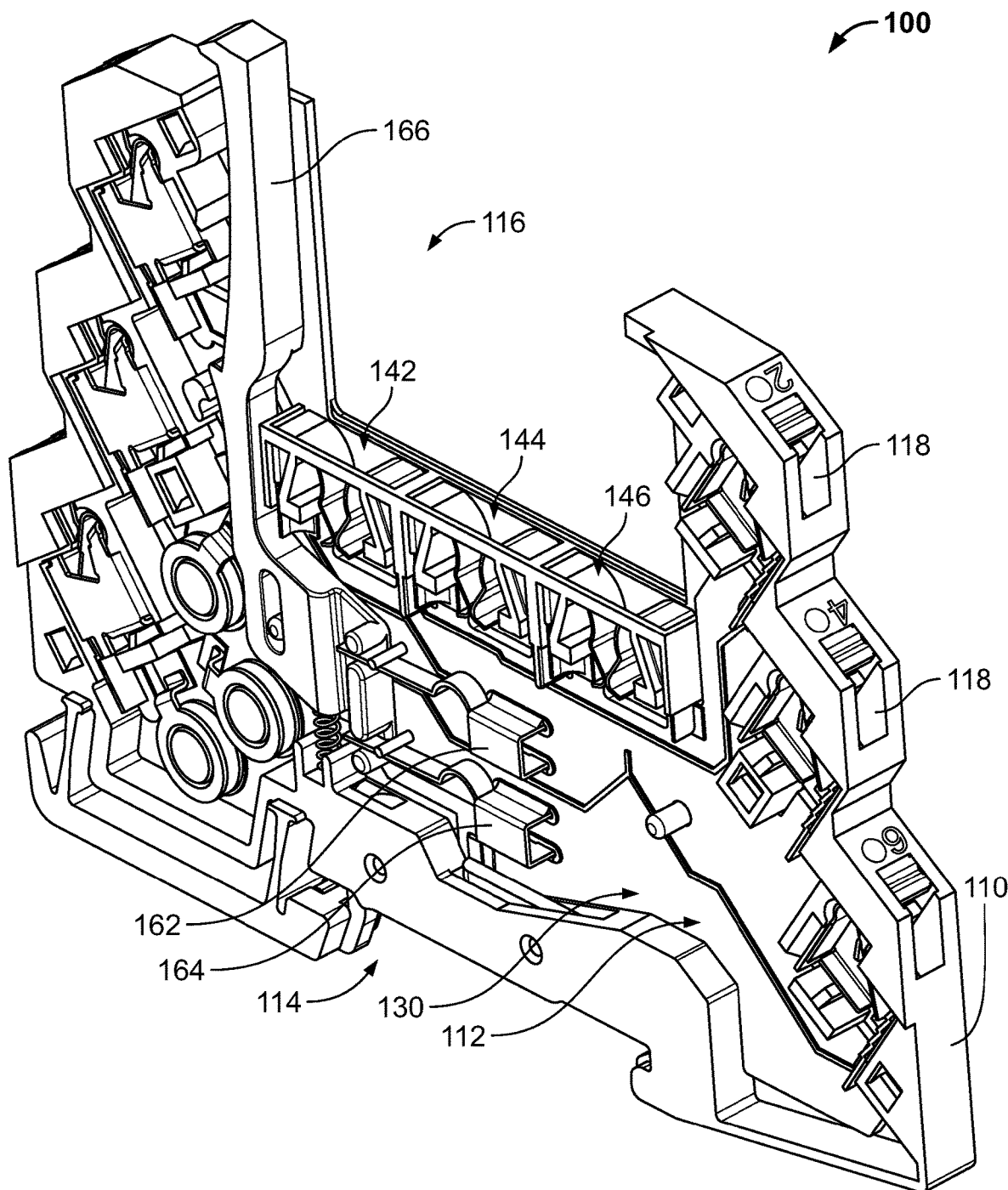
FIG. 5 is a perspective view of a base module forming a part of the SPD assembly of FIG. 1.
Figure 11:
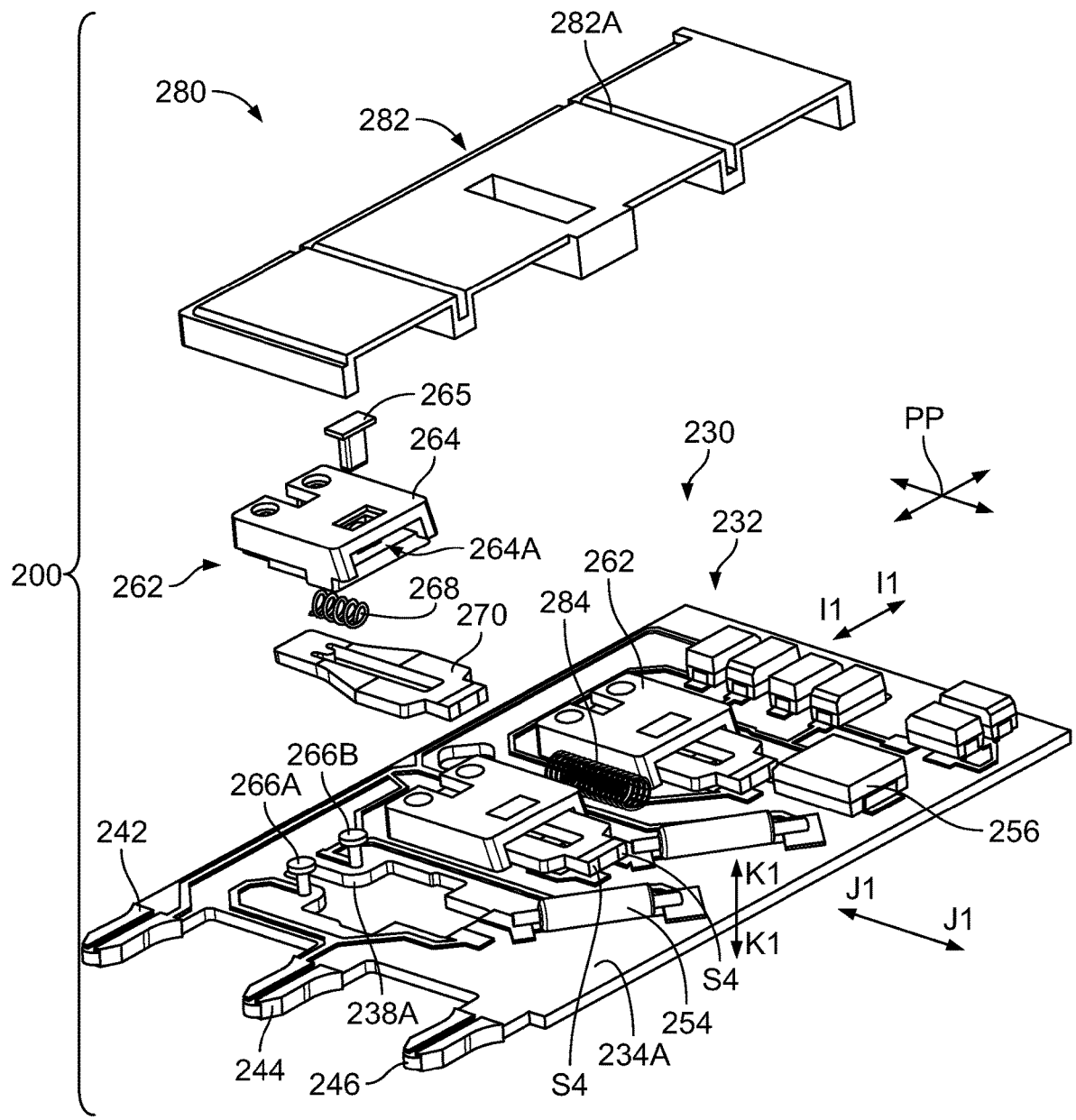
FIG. 11 is an exploded, fragmentary, perspective view of the SPD module.

As discussed in more detail below, the SPD assembly 101 includes a blade connector system 140 (FIGS. 4 and 17), a disconnecting mechanism 160 (FIGS. 4 and 22), thermal disconnector mechanisms 260 (FIGS. 9 and 13), and a status indicator mechanism 280 (FIGS. 4 and 11).

The base module 100 (FIG. 5) includes a housing 110, an electrical assembly 130, and the disconnecting mechanism 160. The base module 100 has a fore-aft or SPD module receiving axis A-A (FIG. 1) that extends transversely to and, in some embodiments, substantially perpendicular to the lengthwise axis B-B the DIN rail 40.

According to some embodiments, the housing 110 is formed of an electrically insulating polymeric material. The housing 110 may be formed of any suitable material or materials. In some embodiments, the housing 110 is formed of a rigid polymeric material or metal (e.g., aluminum). Suitable polymeric materials may include polyamide (PA), polypropylene (PP), polyphenylene sulfide (PPS), or ABS, for example.

The base housing 110 defines an enclosed cavity 112 containing the electrical assembly 130. A DIN rail receiver channel 114 is defined in the rear side of the base module 100. Integral rail hook features may be located on one side of the channel 114 and a spring-loaded DIN rail latch mechanism may be mounted on the other side of the channel 114 to securely and releasably mount the base module 100 on a standard DIN rail as is known in the art. A module receiver seat or slot 116 is defined in the front side of the base module 100. The receiver slot 116 is open from the front.

Cable ports 118 are defined on opposed upper and lower sides of the housing 110. One cable port 118 is provided for each of the cables L1, L2, L3, L1', L2', L3'.

Three blade receiver slots 120 (FIG. 1) are defined in the front side of housing 110 at the base of the receiver slot 116. One blade receiver slot 120 is provided for each of the base connectors 142, 144, 146 discussed below. The housing 110 further includes a pair of opposed solder pads 122 (FIG. 16) and a pair of opposed interlock features 124 in each blade receiver slot 120.

The electrical assembly 130 includes a PCB assembly 132, input cable connectors C1, C2, output cable connectors C1', C2', ground cable connectors C3, C3', a first base connector 142, a second base connector 144, a third or ground base connector 146, and a ground contact 148. The base module circuit EB is embodied in the electrical assembly 130.

The PCB assembly 132 includes a PCB 134, three gas discharge tubes (GDTs) 138A, 138B, 138G, and a pair of disconnect switches 162, 164. The PCB assembly 132 may include more or fewer GDTs in other embodiments.

The PCB 134 includes a PCB substrate 136 and a plurality or pattern(s) of electrically conductive (e.g., copper) layers laminated to the substrate and embodied in the PCB 134, as is well known in the art. These electrically conductive layers may include electrically conductive traces, pads, vias, and/or plated through-holes, for example. While certain of these electrically conductive features are specifically mentioned in this description, it will be appreciated that the PCB 134 may include additional electrically conductive features to effect the electrical circuits represented in the figures and as needed to implement the functionality disclosed herein.

Figure 6:
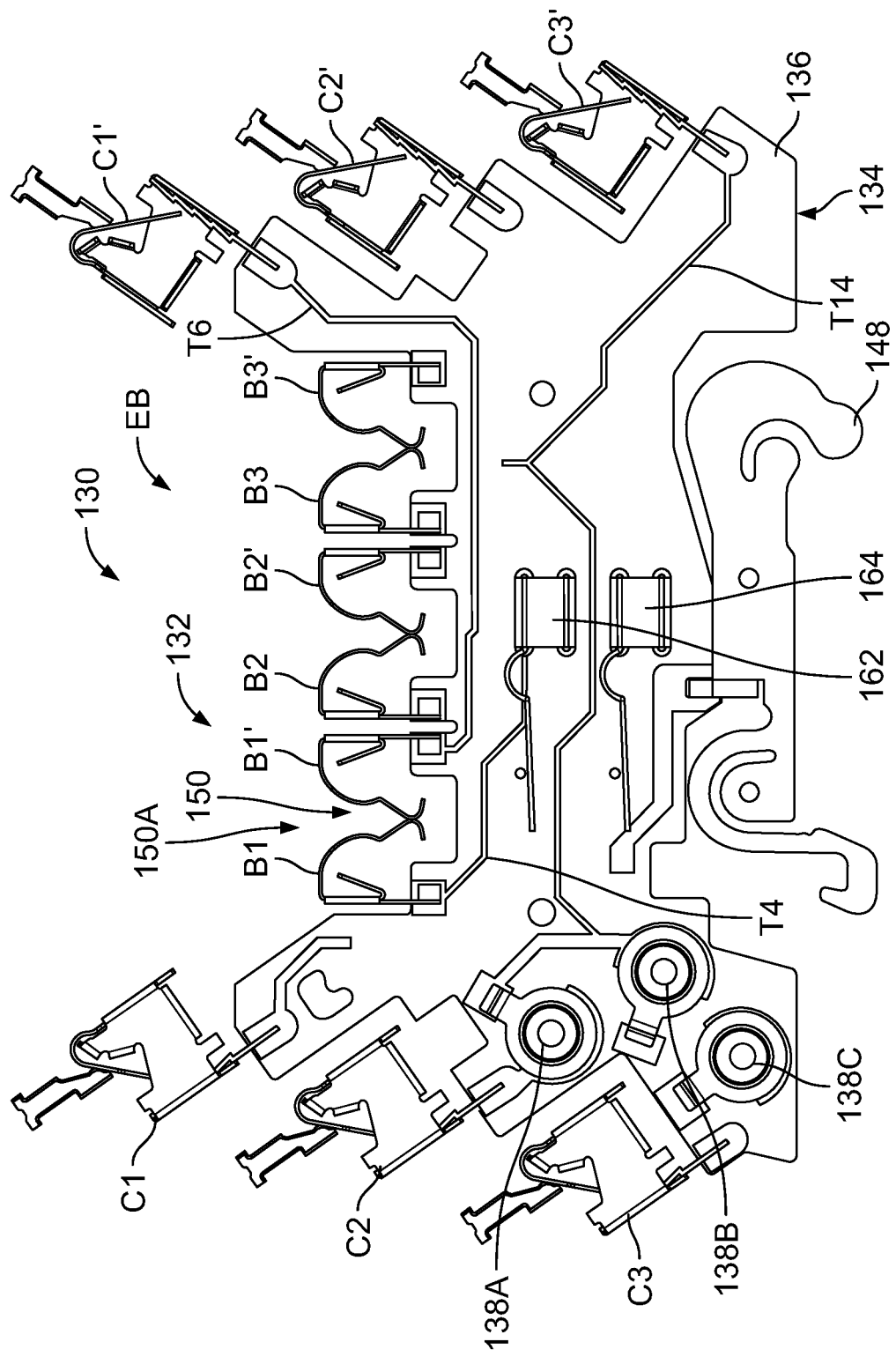
FIG. 6 is a first side view of an electrical assembly forming a part of the base module of FIG. 5.

The first base connector 142 includes a base contact B1 and a base contact B1'. The second base connector 144 includes a base contact B2 and a base contact B2'. The ground base connector 146 includes a base contact B3 and a base contact B3'. Each pair of contacts defines a connector slot 150 and an opening 150A communicating with the connector slot 150 (FIG. 6).

The base contacts B1, B1', B2, B2', B3, B3' may all be constructed and mounted in the housing 110 in the same manner. The base contact B1 will be described in detail below; however, it will be appreciated that this description applies also to the other base contacts.

Figure 8:
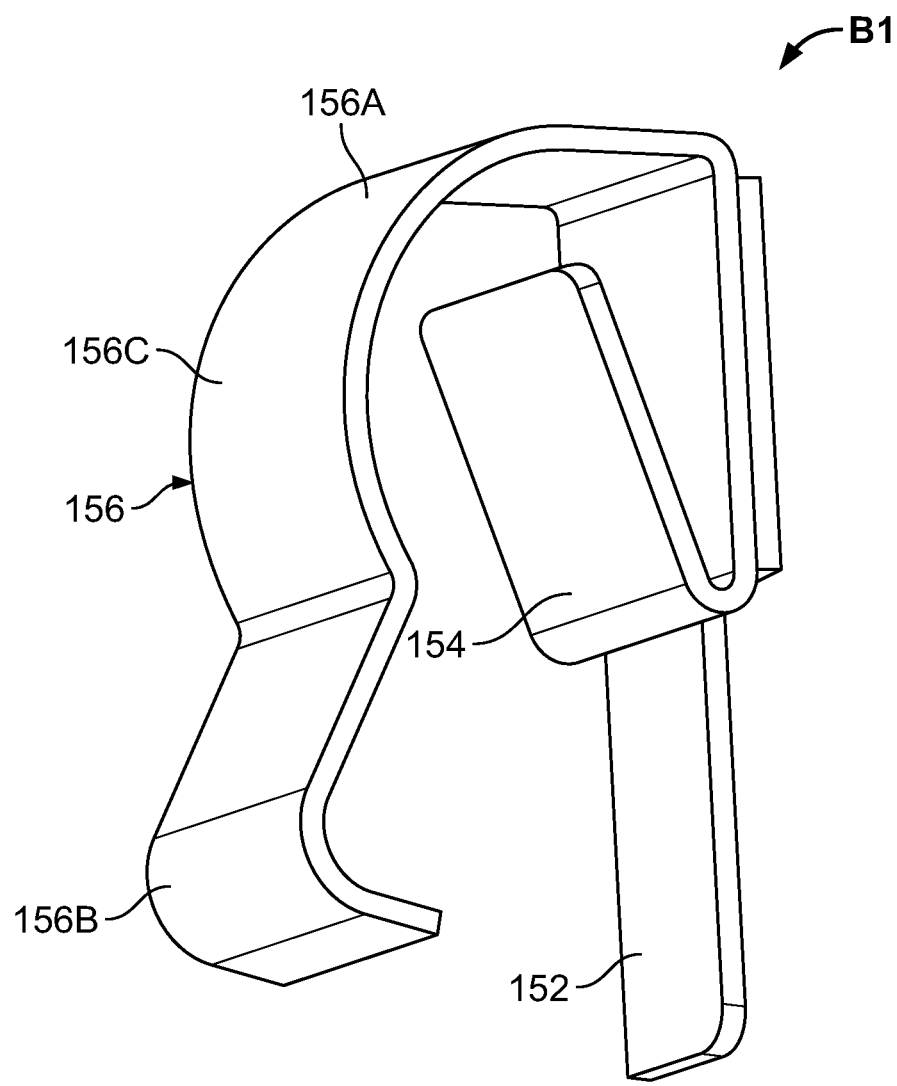
FIG. 8 is a perspective view of a base contact forming a part of the base module of FIG. 5.
Figure 16:
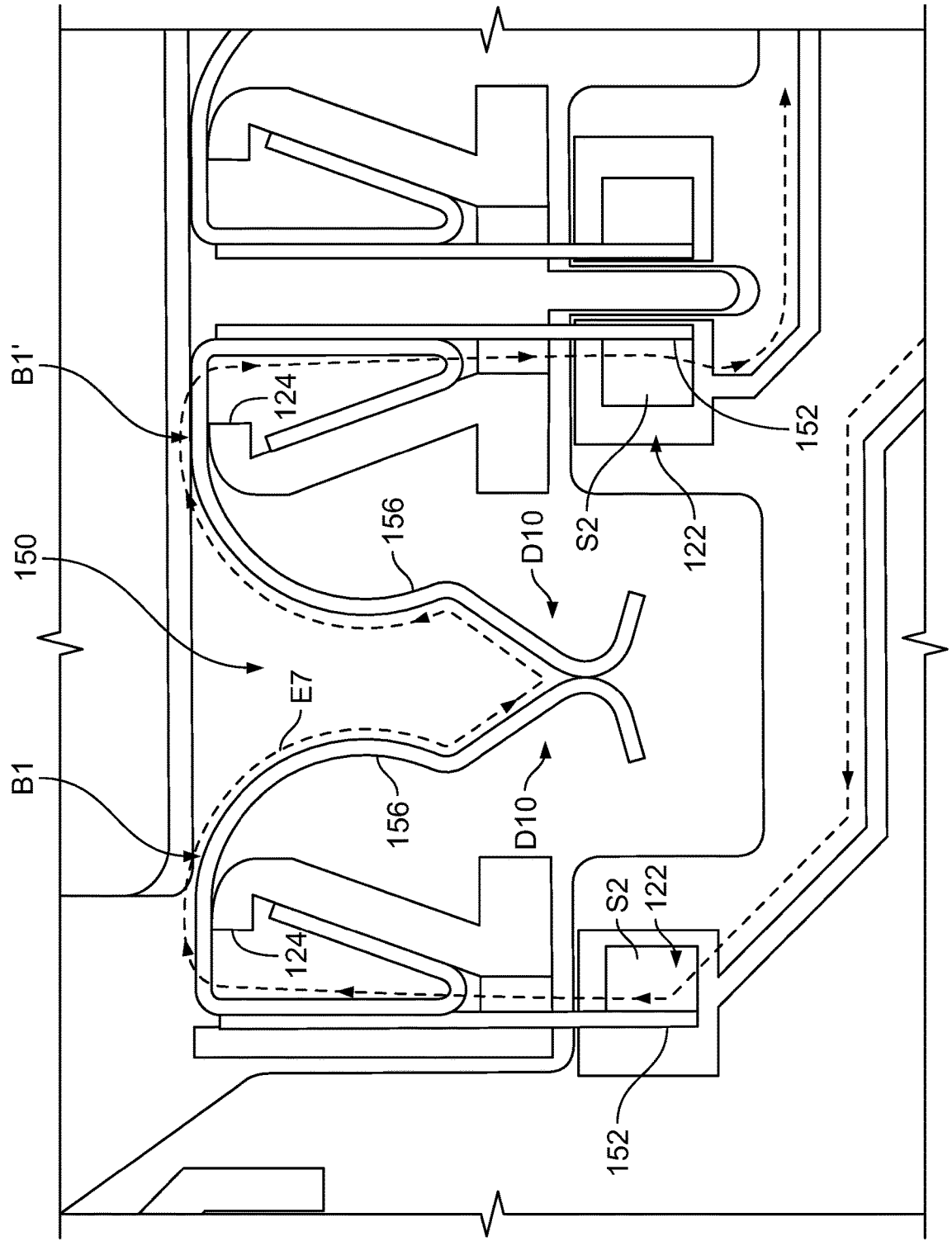
FIG. 16 is an enlarged, fragmentary, cross-sectional view of the base module.

With reference to FIGS. 8 and 16, the base contact B1 includes an inner contact leg 152, an interlock tab 154, and a spring contact leg 156. The spring contact leg 156 includes an entry section 156A, an inner section 156B, and an interlock section 156C. The spring contact leg 156 is cantilevered from the contact leg 152 such that the spring contact leg 156 can be elastically deformed or deflected in directions D10, D12 toward and away from the opposing base contact. The interlock section 156C protrudes inwardly toward the slot 150.

With reference to FIG. 16, each base contact B1, B1', B2, B2', B3, B3' is mounted in its slot 120 such that its inner contact leg 152 is seated on or closely adjacent the associated solder pad 122 and its interlock tab 154 engages the adjacent housing interlock feature 124 to prevent or resist withdrawal of the base contact from its slot. Each inner contact leg 152 is secured in its solder pad 122 by a solder S2.

Figure 17:
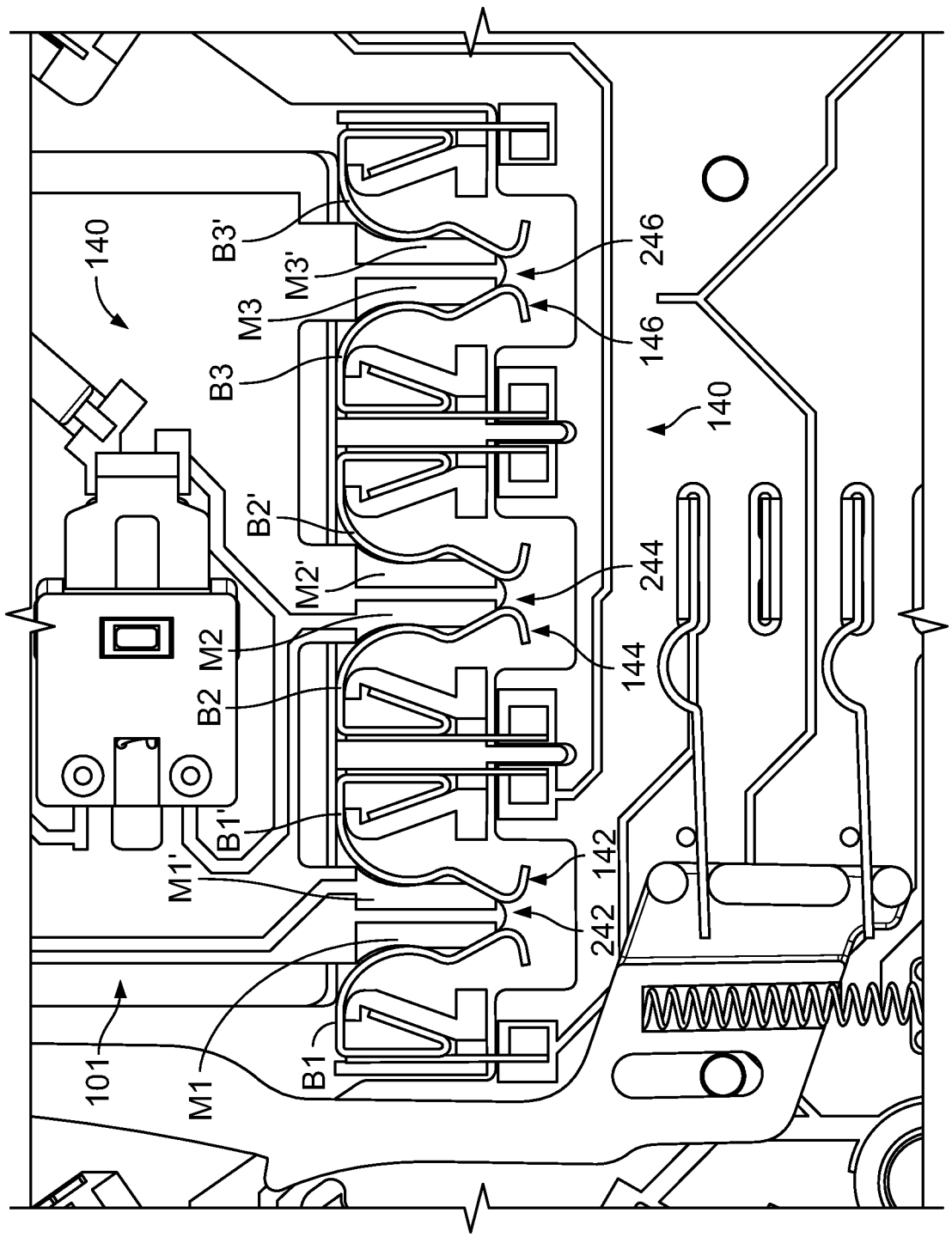
FIG. 17 is an enlarged, fragmentary, cross-sectional view of the of the SPD assembly of FIG. 1.
Figure 18:
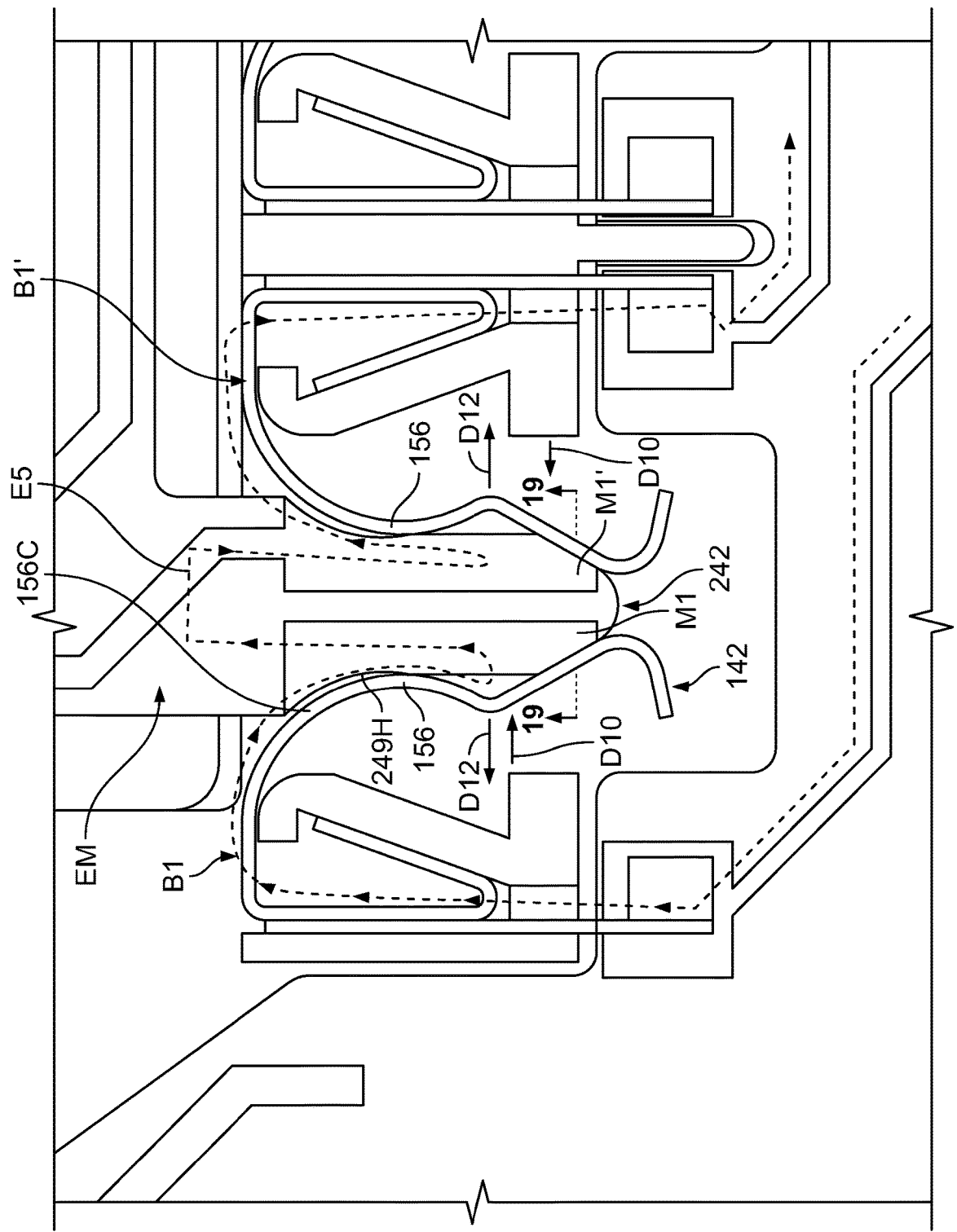
FIG. 18 is an enlarged, fragmentary, cross-sectional view of the of the SPD assembly of FIG. 1.

Generally, each base connector 142, 144, 146 is configured to assume an occupied or connecting position (e.g., as shown in FIGS. 17 and 18) wherein a blade connector 242, 244, 246 is seated in the base connector 142, 144, 146, and an unoccupied or non-connecting position (e.g., as shown in FIG. 16) wherein no connector is seated in the base connector 142, 144, 146. The blade connector system 140 includes the base connectors 142, 144, 146 and the blade connectors 242, 244, 246.

Each base connector 142, 144, 146 is configured such that, in the non-connecting position, the opposing spring contact legs 156 of its contacts (e.g., B1 and B1') contact one another (as shown in FIG. 16). In some embodiments, the base connector is configured such that, in the non-connecting position, one or both of the spring contact legs 156 is elastically deflected and exerts a persistent compressive load (in directions D10) to force the opposing spring contact legs 156 to bear against one another.

The base contacts B1, B1', B2, B2', B3, B3' may be formed of any suitable material or materials. In some embodiments, the base contacts B1, B1', B2, B2', B3, B3' are formed of metal. In some embodiments, the base contacts B1, B1', B2, B2', B3, B3' are formed of resilient, elastically deflectable metal. Suitable metal materials may include nickel brass, CuSn 0.15, CuSN 6, CuP 0.008, for example. In some embodiments, each base contact B1, B1', B2, B2', B3, B3' is unitary and, in some embodiments, is monolithic.

Figure 22:
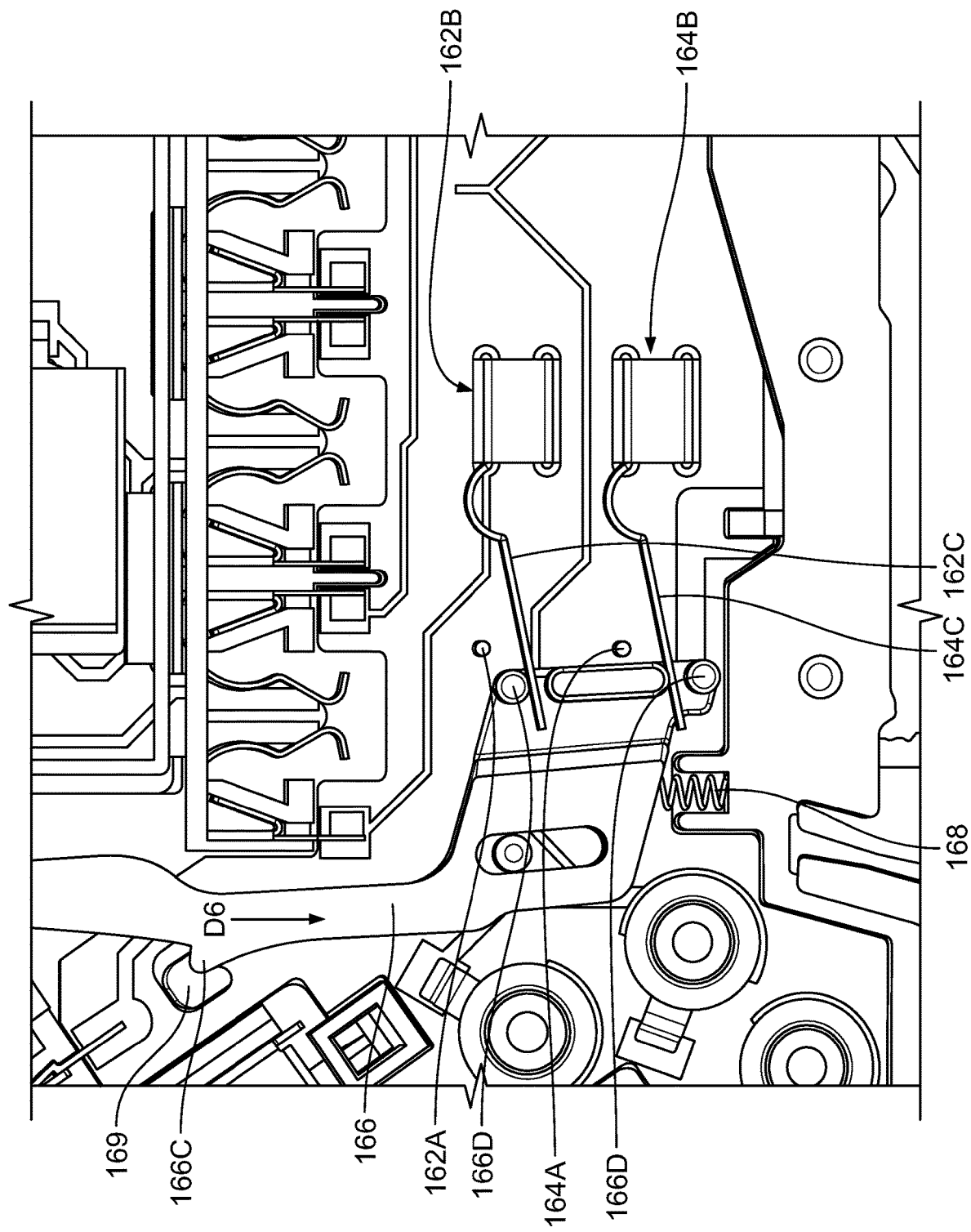
FIG. 22 is an enlarged, fragmentary view of the of the SPD assembly of FIG. 1.

With reference to FIGS. 4 and 22, the disconnecting mechanism 160 includes a lever or actuator member 166, a spring 168, a latch feature 169 (e.g., integral with the housing 110), a first disconnect switch 162, and a second disconnect switch 164.

The actuator member 166 includes a handle 166A, a guide slot 166B, a latch feature 166C, and a pair of switch engagement features 166D.

The first disconnect switch 162 includes an electrically conductive pin 162A and a spring unit 162B mounted and electrically connected to the PCB 134. The second disconnect switch 164 includes an electrically conductive pin 164A and a spring unit 164B mounted and electrically connected to the PCB 134. The pins 162A, 164A may be inserted into and soldered to the PCB 134.

The spring 168 biases the actuator member 166 toward and into the position shown in FIG. 4, wherein spring legs 162C, 164C of the spring unit 162B and the spring unit 164B electrically connect the spring unit 162B and the spring unit 164B to the pin 162A and the pin 164A, respectively (i.e., the switches are closed). In use, the operator can press the lever 166 in an opening direction D6, whereby the actuator member 166 displaces the spring legs 162C, 164C out of contact with the pins 162A, 164A to electrically disconnect the spring units 162B, 164B from the pins 162A, 164A (i.e., the switches are open), as shown in FIG. 22.

Figure 7:
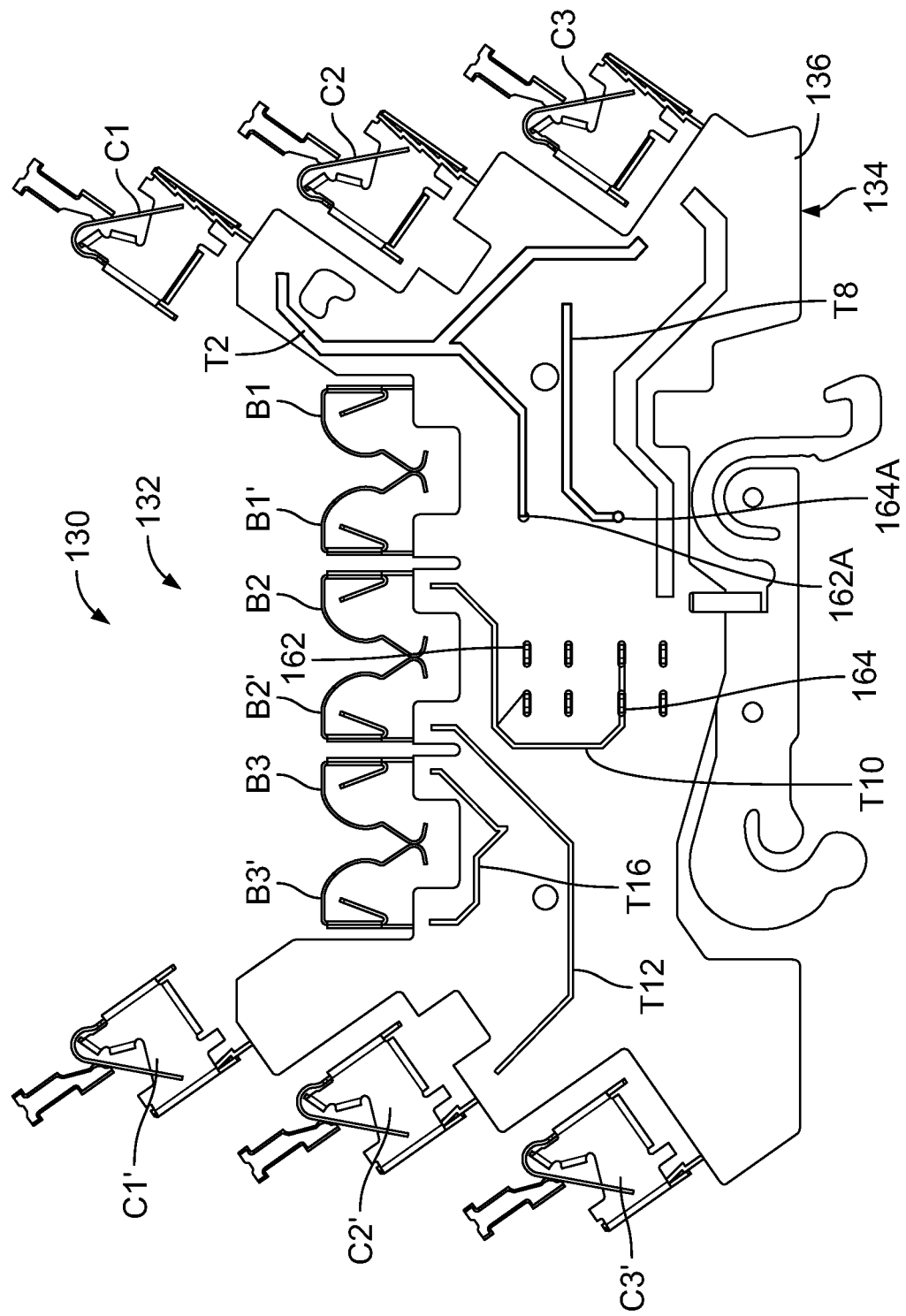
FIG. 7 is an opposing, second side view of the electrical assembly of FIG. 6.

With reference to FIGS. 6 and 7 (which show the right and left side faces of the PCB 134, respectively), the electrical assembly 130 further includes: a trace T2 from the connector C1 to the pin 162A; a trace T4 from the switch 162 to the contact B1; a trace T6 from the connector C1' to the contact B1'; a trace T8 from the connector C2 to the pin 164A; a trace T10 from the switch 164 to the contact B2; a trace T12 from the connector C2' to the contact B2'; a trace T14 from the connector C3 to the connector C3', and a trace T16 from trace T14 to B3 and B3'. The traces T4, T6, T10, T12, T14, T16 are electrically connected to the base contacts B1, B1', B2, B2', B3, and B3' by the solders S2.

The SPD module 200 includes a module housing 210, an electrical assembly 230, and an indicator mechanism 280. The SPD module circuit EM is embodied in the electrical assembly 230.

The module housing 210 (FIGS. 1 and 4) defines an enclosed cavity 212 containing the electrical assembly 230. The module housing 210 has a rear end 214 and opposed sidewalls 216. According to some embodiments, the housing 210 is formed of an electrically insulating polymeric material. The housing 210 may be formed of any suitable material or materials. In some embodiments, the housing 210 is formed of a rigid polymeric material or metal (e.g., aluminum). Suitable polymeric materials may include polyamide (PA), polypropylene (PP), polyphenylene sulfide (PPS), or ABS, for example.

Figure 9:
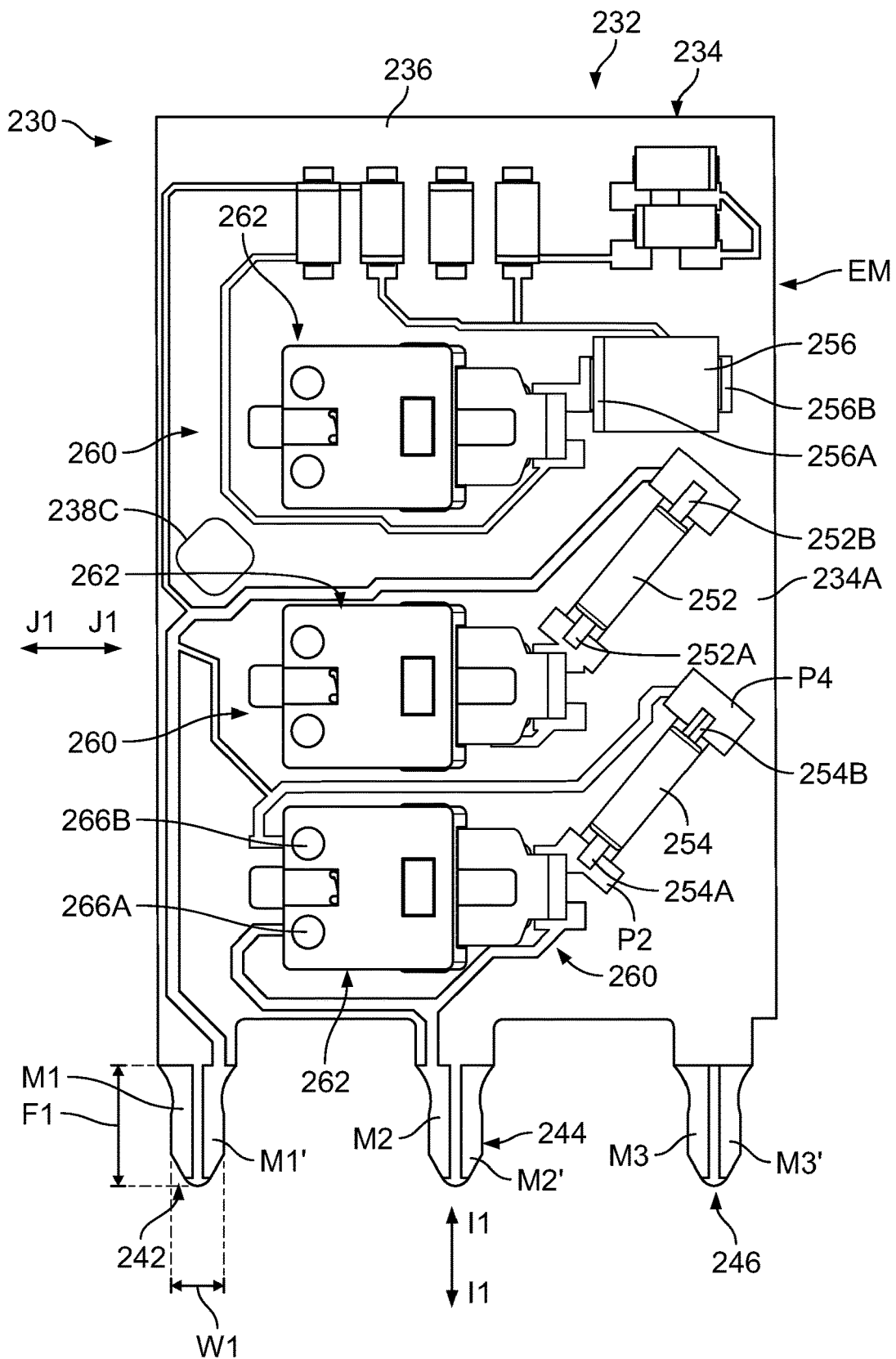
FIG. 9 is a first side view of an electrical assembly forming a part of an SPD module, which forms a part of the SPD assembly of FIG. 1.
Figure 10:
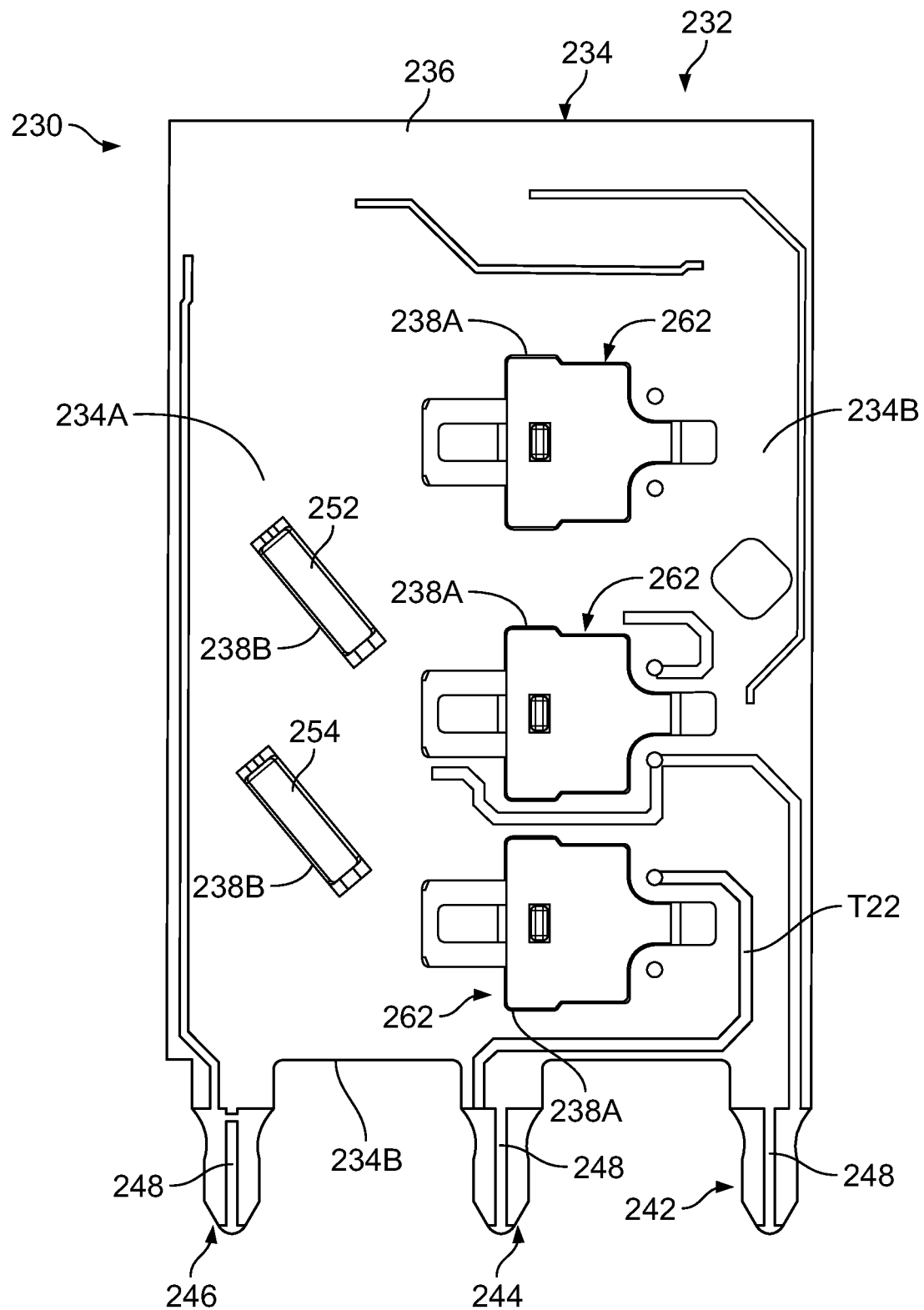
FIG. 10 is an opposing, second side view of the electrical assembly of FIG. 9.

With reference to FIGS. 9-11, the electrical assembly 230 includes a PCB assembly 232. The PCB assembly 232 includes a PCB 234.

The PCB 234 is a substantially planar plate structure and has a substantially planar first side 234A (FIG. 9) and an opposing, substantially planar second side 234B (FIG. 10). The first side 234A defines a main or fore-aft axis I1-I1 and a lateral axis J1-J1 perpendicular to the axis I1-I1. The axes I1-I1, J1-J1 define a PCB plane PP (FIG. 11). The PCB 234 further has a thickness axis K1-K1 perpendicular to each of the axes I1-I1, J1-J1. Openings 238A, 238B, 238C are defined in the PCB 234 and extend fully through the substrate 236. The PCB 234 includes a main section 234A having an end edge 234B.

The PCB 234 includes a PCB substrate 236 and a plurality or pattern(s) of electrically conductive (e.g., copper) layers laminated to the substrate and embodied in the PCB 234, as is well known in the art. These electrically conductive layers may include electrically conductive traces, pads, vias, and/or plated through-holes, for example. While certain of these electrically conductive features are specifically mentioned in this description, it will be appreciated that the PCB 234 may include additional electrically conductive features to effect the electrical circuits represented in the figures and as needed to implement the functionality disclosed herein.

The PCB assembly 232 further includes a first blade connector 242, a second blade connector 244, and a third or ground blade connector 246, each projecting rearwardly from the rear end 214.

Figure 12:
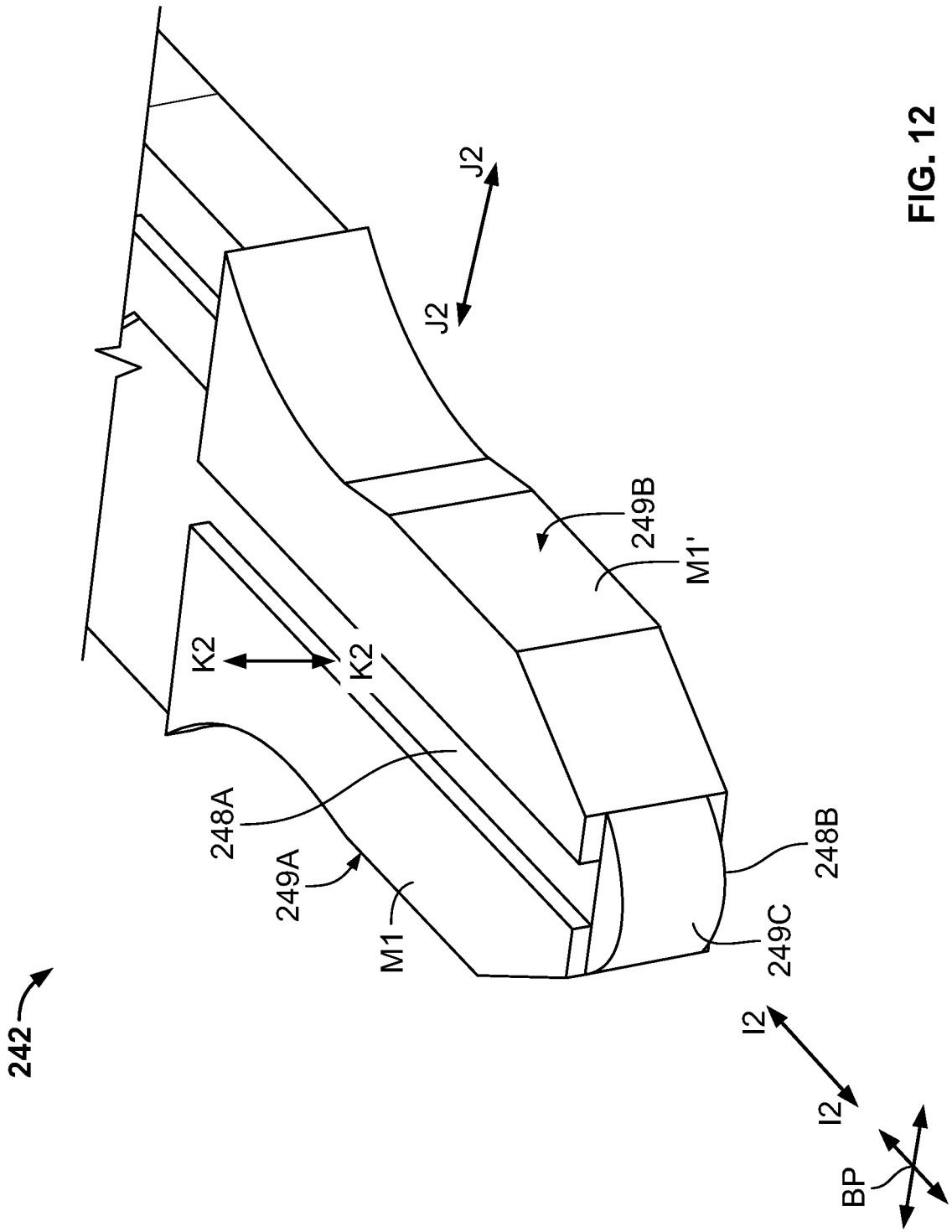
FIG. 12 is an enlarged, fragmentary, perspective view of a blade connector forming a part of the SPD module.
Figure 13:
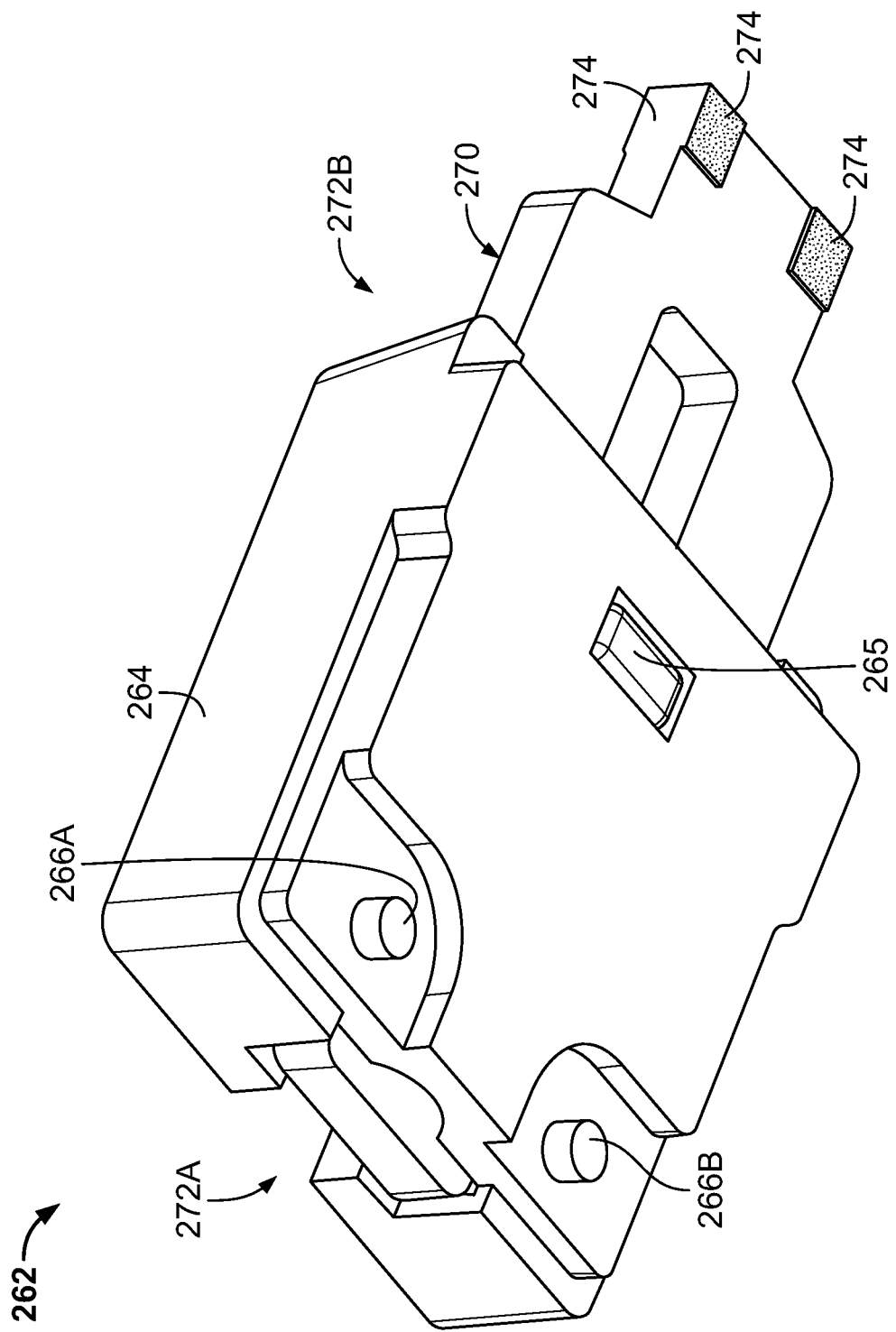
FIG. 13 is a bottom perspective view of a thermal actuator forming a part of the SPD module.

With reference to FIG. 12, the blade connectors 242, 244, 246 may all be constructed in the same manner. The blade connector 242 will be described in detail below; however, it will be appreciated that this description applies also to the other blade connectors 244, 246.

With reference to FIG. 12, the blade connector 242 includes a blade tab 248. The blade tab 248 projects or extends from the end edge 234B of the main section 234A along the fore-aft axis I1-I1. In some embodiments, each blade tab 248 is an integral part of the substrate 236. For example, the substrate 236 may be a single piece that is cut or formed in the shape of the main section 234A and the three tabs 248, which together form a single rigid component. Accordingly, the blade tabs 248 may form integral parts of the PCB 234 extending from an end edge 234B of the PCB main section 234A that supports the electrical components 252-256 and other elements of the SPD module circuit EM.

The tab 248 is a substantially planar plate structure and has a substantially planar first side 248A and an opposing, substantially planar second side 248B. The first side 248A defines a main or fore-aft axis I2-I2 (parallel with the axis I1-I1), and a lateral axis J2-J2 (parallel with the axis J1-J1) perpendicular to the axis I2-I2. The axes I2-I2, J2-J2 define a blade connector plane BP (FIG. 12). The tab 248 further has a thickness axis K2-K2 perpendicular to each of the axes I2-I2, J2-J2.

The blade connector 242 has a leading or distal end 249C, a first lateral or left side edge 249A, and an opposing second lateral or right side edge 249B. Each side edge 249A, 249B has a laterally inward extending recess 249H in its midsection to form opposed interlock features.

Figure 19:
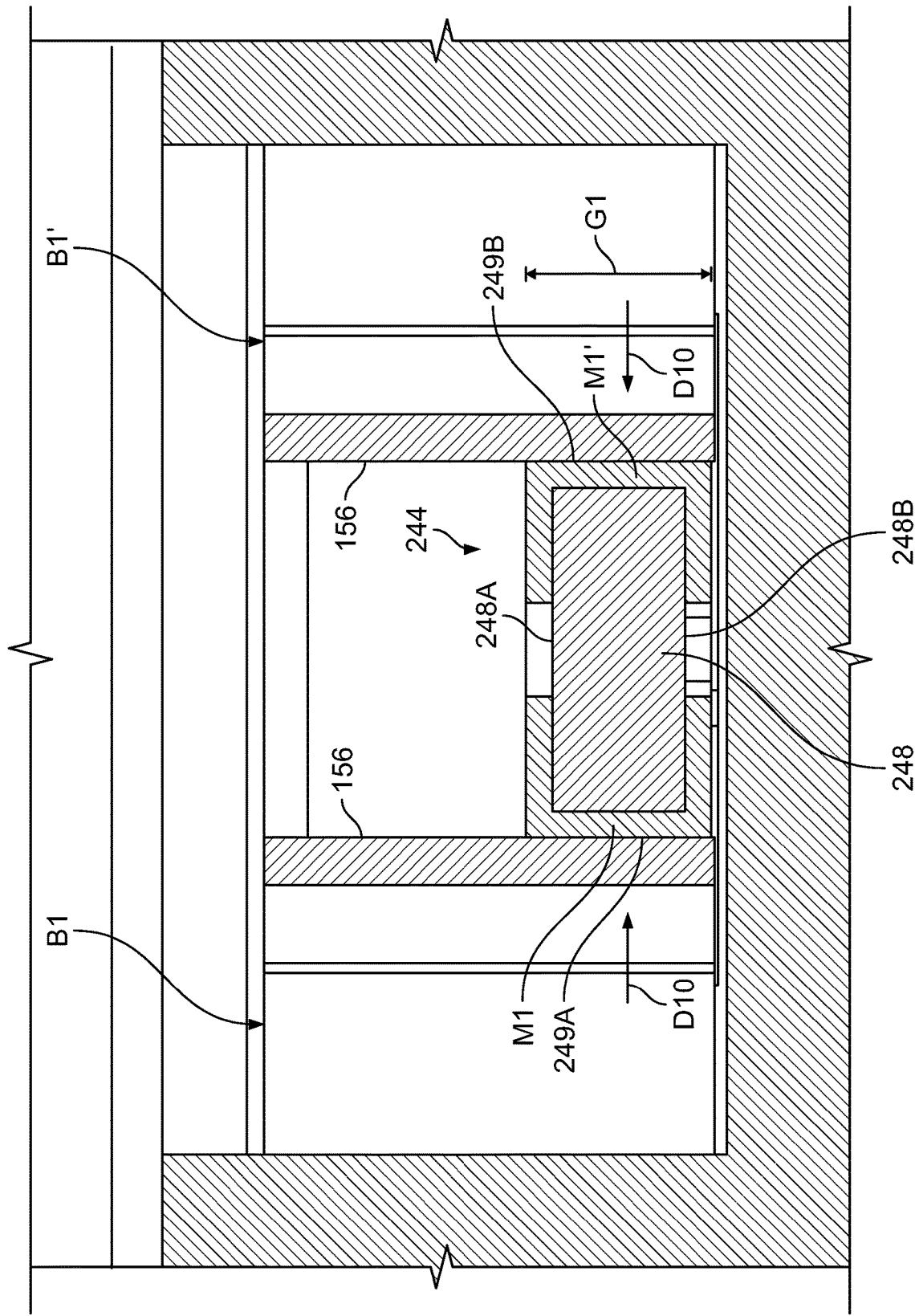
FIG. 19 is an enlarged, fragmentary, cross-sectional view of the of the SPD assembly of FIG. 1 taken along the line 19-19 of FIG. 18.

Each blade connector 242, 244, 246 has a maximum width W1 (FIG. 9; along axis J2-J2), a length F1 (along axis I2-I2), and a thickness G1 (FIG. 19; along axis K2-K2). The thickness dimension G1 is less than the width dimension W1 and is less than the length dimension F1. In some embodiments, the width dimension W1 and the length dimension F1 are each at least two to five times the thickness dimension G1.

Each blade connector 242, 244, 246 has a pair of opposed electrically conductive contact layers mounted or secured on its opposed side edges 249A, 249B. An input contact layer M1 is located on the left side edge 249A of the first blade connector 242, and an output contact layer M1' is located on the right side edge 249A of the blade connector 242. An input contact layer M2 is located on the left side edge 249A of the second blade connector 244, and an output contact layer M2' is located on the right side edge 249A of the blade connector 244. An input contact layer M3 is located on the left side edge 249A of the third blade connector 246, and an output contact layer M3' is located on the right side edge 249A of the blade connector 246.

The contact layers M1, M1', M2, M2', M3, M3' may be formed in any suitable manner. In some embodiments, the M1, M1', M2, M2', M3, M3' are formed on the PCB substrate tabs 248 by PCB etching. In some embodiments, the M1, M1', M2, M2', M3, M3' are formed on the PCB substrate tabs 248 using a plating or metallizing technique.

The contact layers M1, M1', M2, M2', M3, M3' may be formed of any suitable electrically conductive material. In some embodiments, the M1, M1', M2, M2', M3, M3' are formed of metal. In some embodiments, the M1, M1', M2, M2', M3, M3' are formed of copper or copper with tin, gold or nickel plating.

With reference to FIGS. 9-11, the PCB assembly 232 further includes a first electrical component 252, a second electrical protection component 254, a third electrical component 256, and three thermal disconnectors 260. Each thermal disconnector 260 includes a thermal actuator 262.

The electrical components 252, 254 are mounted in respective ones of the PCB openings 238B. The electrical component 256 is surface mounted on the PCB 234. The thermal actuators 262 are mounted in respective ones of the PCB openings 238A.

With reference to FIG. 9, the first electrical component 252 includes a first electrical terminal 252A and a second terminal 252B. The second electrical component 254 includes a first electrical terminal 254A and a second terminal 254B. The third electrical component 256 includes a first electrical terminal 256A and a second terminal 256B. While three electrical components are shown for the purpose of illustration, the SPD module 200 may include more or fewer electrical components.

The electrical components 252-256 may be any suitable type and construction of electrical component. Each electrical component 252-256 may be a passive electrical component or an active electrical component. In some embodiments, one or more of the electrical components 252-256 is or includes an overvoltage protection component. In the illustrated embodiment of FIGS. 9-11, the electrical components 252, 254 are electrical resistors and the electrical component 256 is an overvoltage protection component. However, the PCB assembly 232 may include more or fewer electrical components in different combinations (e.g., multiple overvoltage protection components) each protected by a respective thermal disconnector 260.

The overvoltage protection component 256 (as well as any additional overvoltage protection components) may be a passive overvoltage protection component or an overvoltage protection electrical component. In some embodiments, the overvoltage protection component 256 is or includes an overvoltage clamping element. In some embodiments, the overvoltage protection component 256 is or includes a varistor (e.g., a metal-oxide varistor (MOV)). In some embodiments, the overvoltage protection component 256 is or includes a diode. In some embodiments, the diode is a transient-voltage-suppression (TVS) diode. In some embodiments, the overvoltage protection component 256 is or includes a voltage-responsive switching component. In some embodiments, the overvoltage protection component 256 is or includes a GDT. In the illustrated embodiment of FIGS. 9-11, the overvoltage protection component 256 is a TVS diode.

A respective one of the thermal disconnector mechanisms 260 is associated with each of the electrical components 252, 254, 256. The thermal disconnector mechanisms 260 may all be constructed in the same manner. The thermal disconnector mechanism 260 paired with and protecting the electrical component 254 will be described in detail below. However, it will be appreciated that this description applies also to the thermal disconnector mechanisms 260 paired with the other electrical components 252, 256.

With reference to FIGS. 11 and 13-15, the thermal disconnector mechanism 260 includes a thermal actuator 262. The thermal actuator 262 includes an actuator body 264, a spring pin 265, a pair of spaced apart electrically conductive electrically conductive switch contacts or bypass contacts 266A, 266B, an actuator spring 268, and a switch member 270.

In some embodiments and as shown, the bypass contacts 266A, 266B are electrically conductive pins mounted on the PCB 234. The electrically conductive pins 266A, 266B are laterally spaced apart and fixedly mounted on the PCB 234. The electrically conductive pins 266A, 266B are electrically connected to the PCB 234 as discussed below. The pins 266A, 266B may be formed of any suitable material. In some embodiments, the pins 266A, 266B are formed of metal. Suitable metals may include CuSn6, Cu, or CuZn37, optionally with additional tin, gold of nickel coating).

Figure 20:
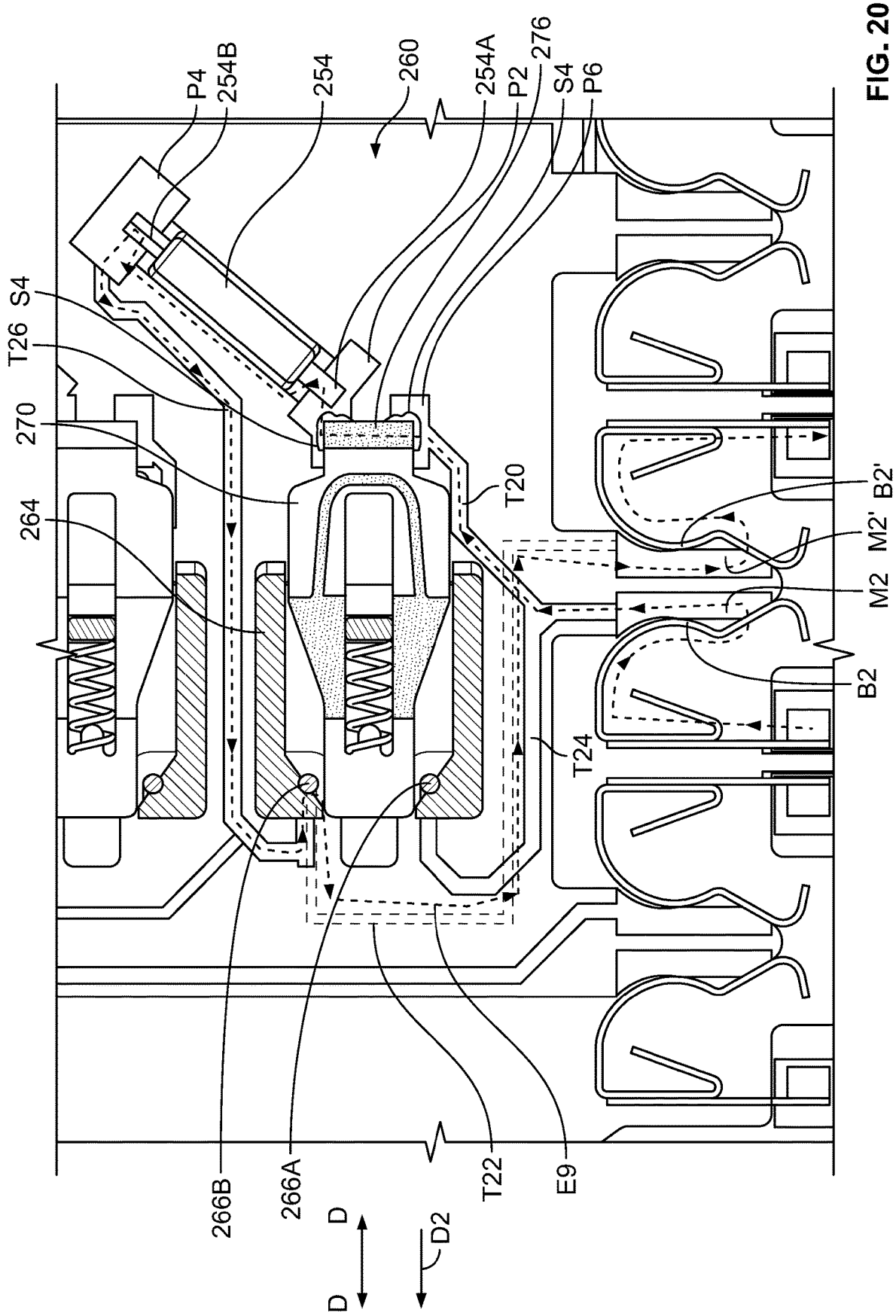
FIG. 20 is an enlarged, fragmentary, cross-sectional view of the of the SPD assembly of FIG. 1.

The actuator body 264 is formed of an electrically insulating material. In some embodiments the actuator body 264 is formed of plastic. A guide channel 264A is defined in the body 264. The switch member 270 is slidably mounted in the guide channel 264A to slidably translate along an axis D-D (FIG. 20). The spring 268 is compressed between the spring pin 265 and the switch member 270 and loads or biases the switch member 270 to translate forwardly, toward the conductive pins 266A, 266B, in an actuator release direction D2 (FIG. 20).

The switch member 270 includes a body 272, a front electrically conductive portion or layer 274, and a rear electrically conductive portion or layer 276.

The body 272 has a front end 272A, an opposing rear end 272B, a guide slot 272C (FIG. 20), a pair of laterally opposed front contact surfaces 273A, and a pair of laterally spaced apart rear contact surfaces 273B. The spring pin 265 is slidably received in the guide slot 272C. The body 272 is formed of an electrically insulating material. In some embodiments the body 272 is formed of plastic.

Figure 14:
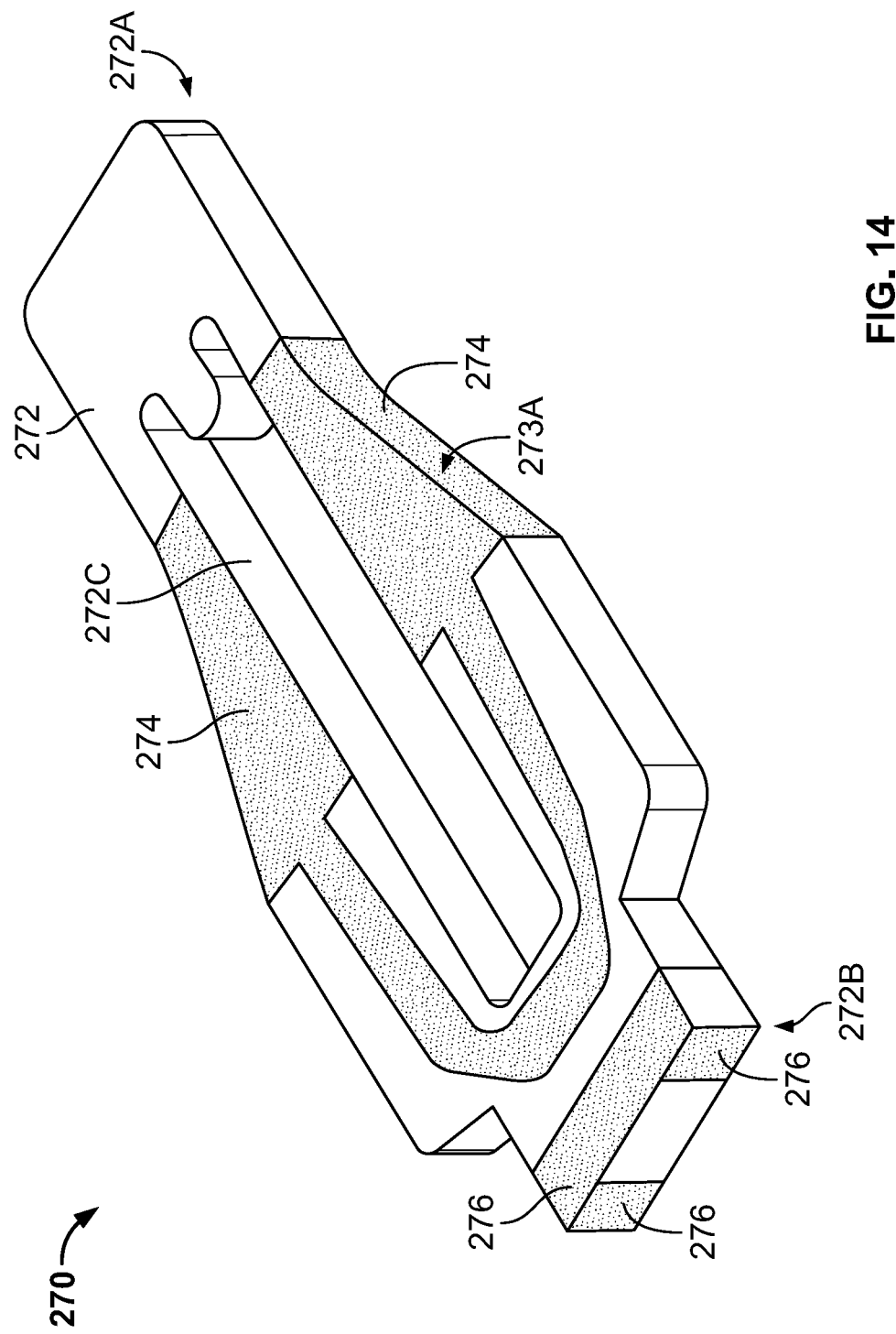
FIG. 14 is a top perspective view of a switch member forming a part of the thermal actuator of FIG. 13.
Figure 15:
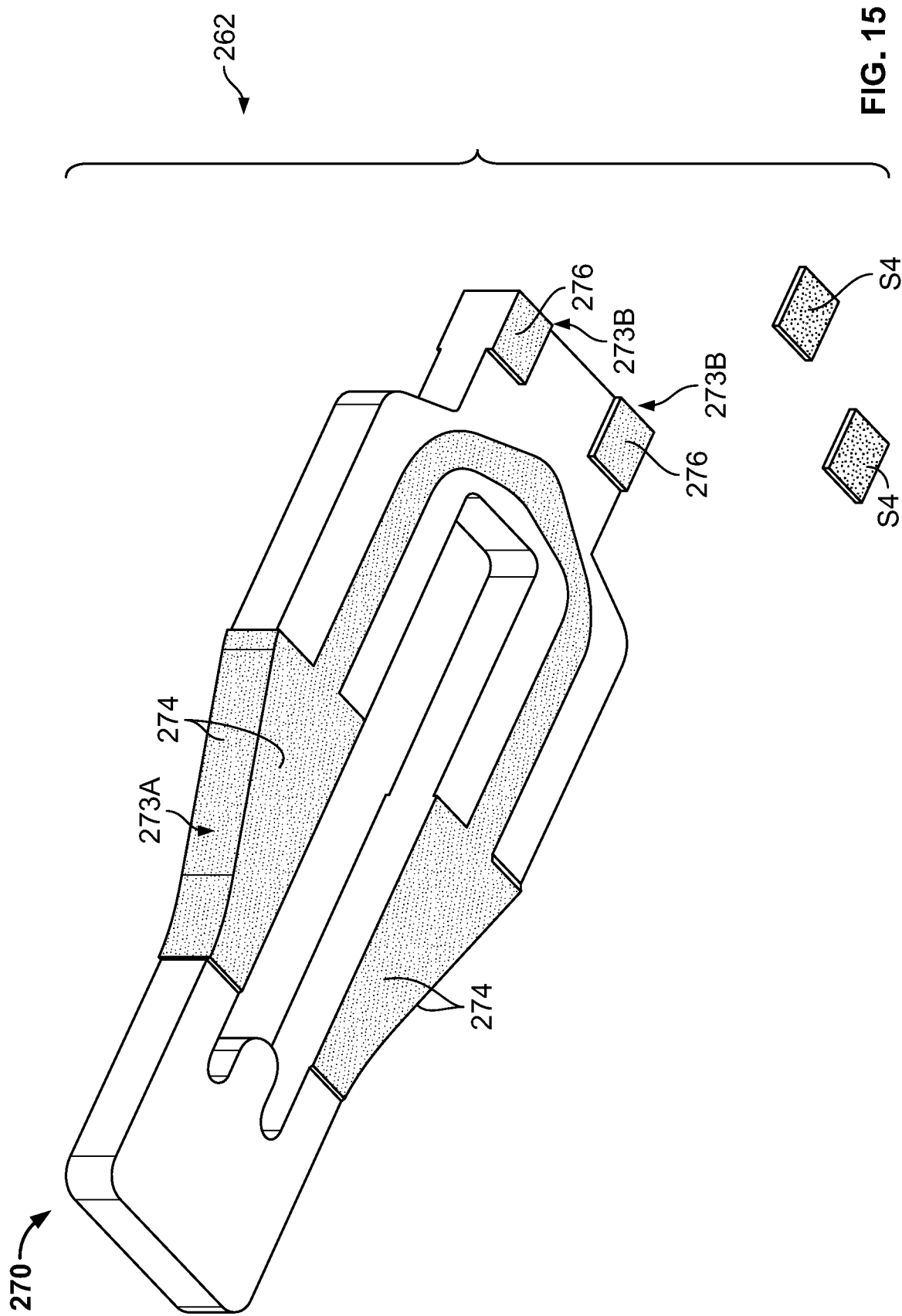
FIG. 15 is a bottom perspective view of the switch member of FIG. 14.

The front electrically conductive layer 274 covers and electrically connects the opposed front contact surfaces 273A. The rear electrically conductive layer 276 covers and electrically connects the rear contact surfaces 273B. The portions of the conductive layer 276 shown on the lower regions 273B as shown in FIG. 15 are electrically connected to one another by the portions of the conductive layer 276 shown on the upper and end wall regions 273B as shown in FIG. 14. The electrically conductive layers 274, 276 may be formed of any suitable material. In some embodiments, the layers 274, 276 are formed of metal. Suitable metals may include copper.

With reference to FIG. 20, the thermal disconnector mechanism 260 further includes a component input terminal pad P2, a component output terminal pad P4, a thermal actuator pad P6, a trace T20 from contact M2 to pad P6, a trace T22 (on the opposing side of the PCB; shown in dashed lines in FIG. 20) from contact M2' to pin 266B, a trace T24 from contact M2 to pin 266A, and a trace T26 from pin 266B to pad P4, and solders S4 on the pads P2 and P6. More particularly, the solders S4 mechanically secure and electrically connect the rear electrically conductive layer 276 to the pad P2 and the pad P6.

Figure 21:
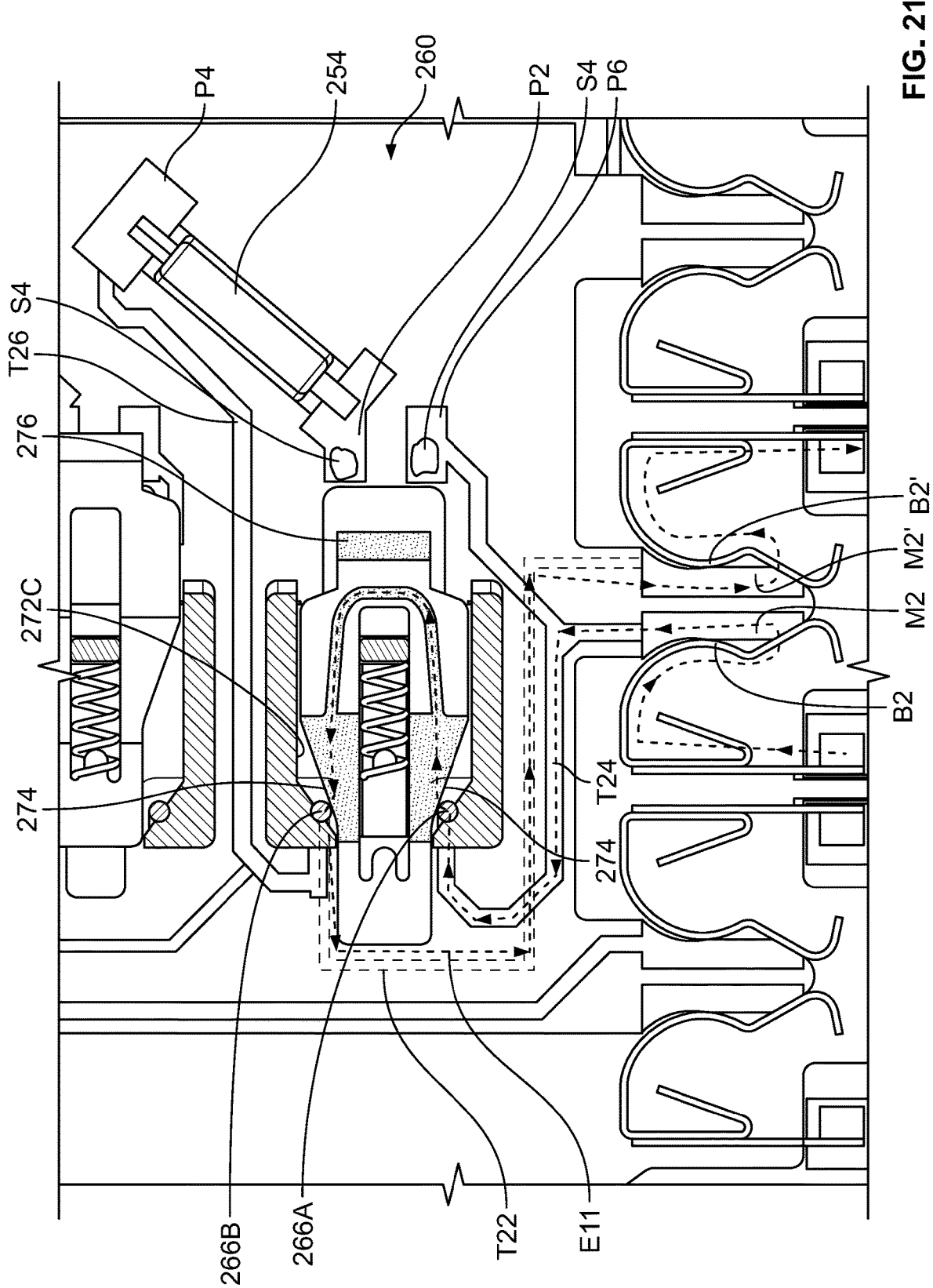
FIG. 21 is an enlarged, fragmentary, cross-sectional view of the of the SPD assembly of FIG. 1.

The thermal disconnector mechanism 260 is initially provided in a ready configuration as shown in FIGS. 9 and 20. In the ready configuration, the switch member 270 is held in a ready position relative to the body 264 by the solders S4 on the pads P2, P6. When sufficient heat is applied to the solders S4, the solders S4 will melt and the spring 268 will forcibly move, displace or force the switch member 270 into an extended or displaced position, whereby the thermal disconnector mechanism 260 assumes an actuated configuration (as shown in FIG. 21). In the ready configuration, the rear conductive layer 276 electrically connects the pad P2 to the pad P6. In the actuated configuration, the front conductive layer 274 electrically connects the pin 266A to the pin 266B.

The indicator mechanism 280 includes an indicator member 282 (FIGS. 4 and 11), window openings 218 (FIG. 1) in each of the housing side walls 216, an indicator window 217 (FIG. 1) in the front wall of the housing 210, and a spring 284. In some embodiments, the window openings 218 are uncovered, so the housing cavity 212 is open.

The indicator member 282 is formed of an electrically insulating material (e.g., plastic). Guide channels 282A are defined in the indicator member 282. The indicator member 282 is slidably mounted in the housing 210 to slidably translate along an axis E-E (FIG. 4). In a ready position as shown in FIG. 4, the spring 284 is compressed between a spring post and the indicator member 282 and loads or biases switch member 270 rearwardly, away from the window openings 217, 218.

The indicator member 282 is positioned relative to each of the thermal disconnector mechanisms 260 such that, when a disconnector mechanism 260 is actuated and the switch member 270 thereof is released in the direction D2, the spring-loaded switch member 270 will force the indicator member 282 to translate in the direction D2 to an indicating position. In the indicating position, the indicator member 282 covers or blocks the window openings 217, 218.

The SPD assembly 101 may be used as follows in accordance with methods of the present invention.

Generally, the GDTs 138A, 138B, 138C in the base 100 provide primary (input) surge protection, and the overvoltage protection component 256 (e.g., TVS diode) in the SPD module 200 provides secondary (output) surge protection for the connected the cables L1, L1', L2, L2', L3, and L3'. The resistors 252 and 254 serve as a connection elements for the lines, and also as energy coordination elements ensuring the timely triggering of the base GDTs 138A, 138B, 138C and limiting the surge let-through energy to the TVS diode 256.

In use, the base module 100 is mounted on the DIN rail 40 as shown in FIG. 1. The ground contact 148 electrically contacts the grounded DIN rail 40, thereby connecting the base circuit EB to electrical ground GND.

Cables L1, L1', L2, L2', L3, L3' (shown in dashed line in FIGS. 1 and 2) are inserted through the cable ports 118 of the base module 100 as shown and secured by the respective connectors C1, C1', C2, C2', C3, C3'. The connectors C1, C1', C2, C2', C3, C3' electrically connect the cables L1, L1', L2, L2', L3, and L3', respectively, to the base circuit EB.

Figure 2:
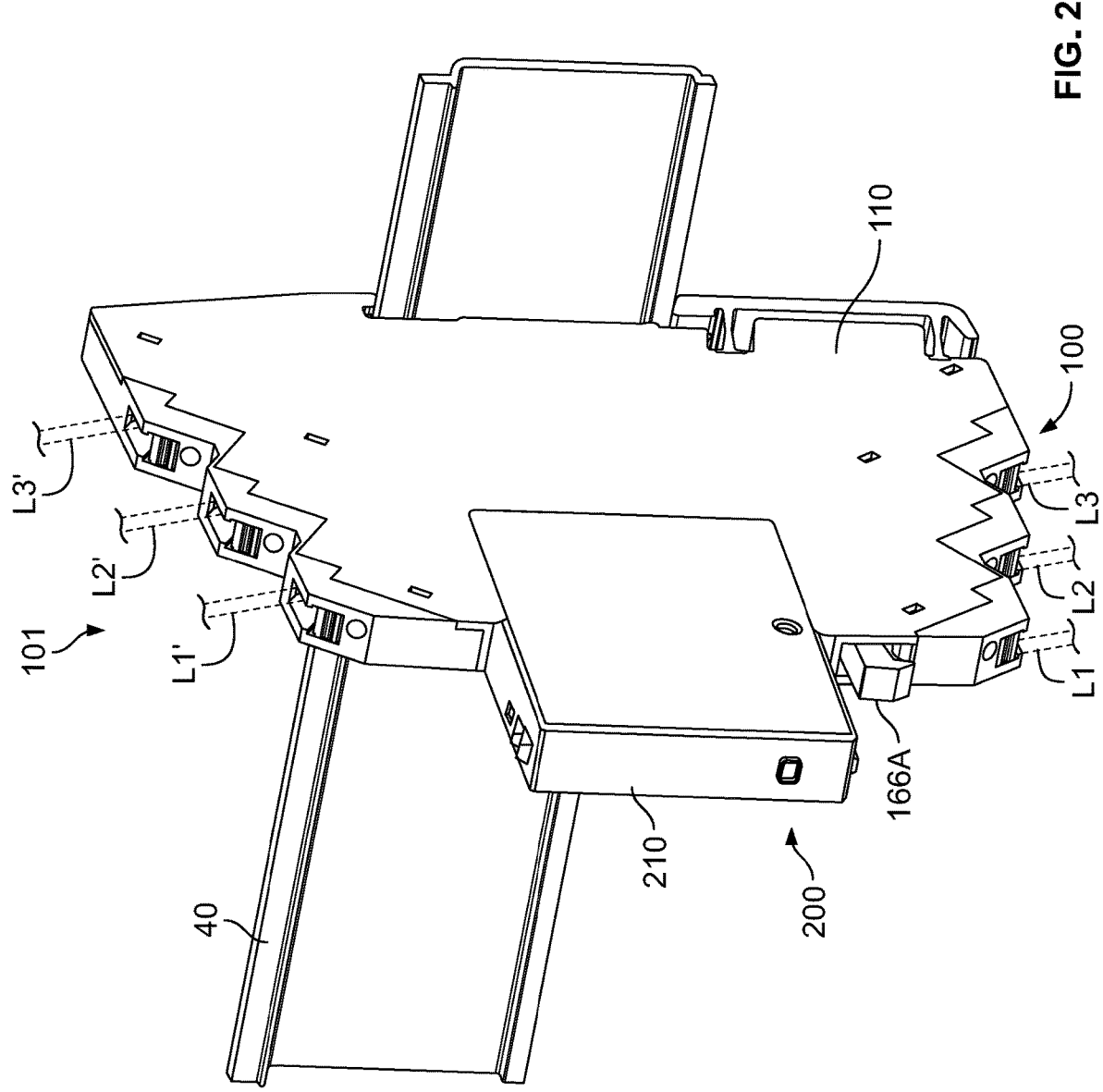
FIG. 2 is a perspective view of the SPD assembly of FIG. 1 mounted on the DIN rail.
Figure 3:
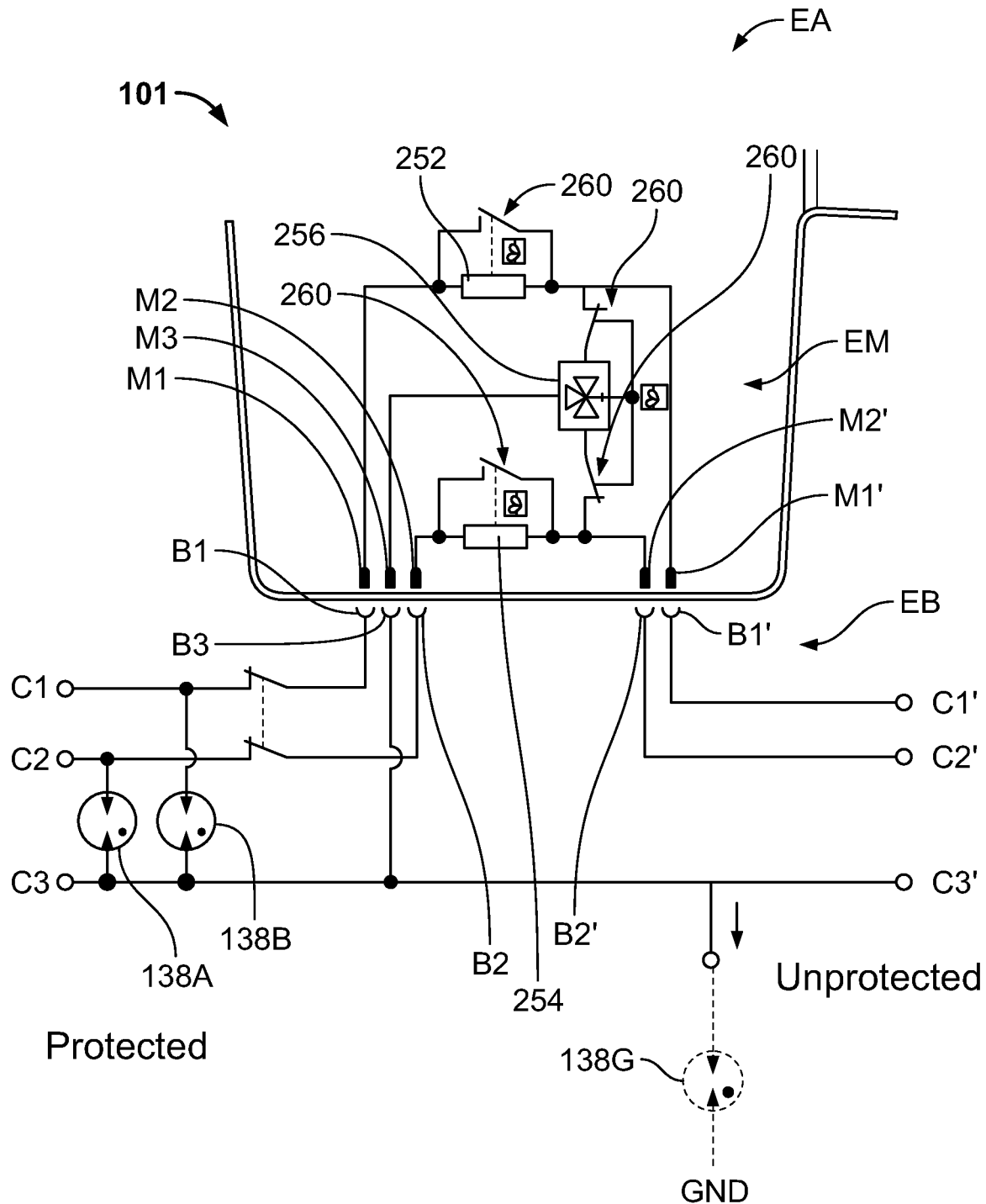
FIG. 3 is a schematic diagram representing an electrical circuit of the SPD assembly of FIG. 1.

The SPD module 200 is axially plugged or inserted into the receiver slot 116 in an insertion direction along the axis A-A through the front opening of the base 100, as shown in FIGS. 2 and 4. The SPD module 200 is pushed back into the receiver slot 116 until the blade connectors 242, 244, 246 of the SPD module 200 are received in the slots 120 and the base connectors 142, 144, 146, respectively, as shown in FIGS. 4 and 17.

The matings between the blade connectors 242, 244, 246 and the base connectors 142, 144, 146, respectively, may each be accomplished, configured and operate in substantially the same manner. Accordingly, the mating of the blade connector 242 to the base connector 142 will be described in detail. This description likewise applies to the other connectors 144, 146, 244, 246.

As the blade connector 242 enters the slot 150 of the base connector 142, the blade connector 242 deflects the spring contact legs 156 of the base contacts B1, 1' in laterally outward directions D12 (FIG. 18). When the blade connector 242 is fully seated (as shown in FIG. 18) the interlock sections 156C are seated in the interlock recesses 249H. In the fully seated position, the spring contact legs 156 are elastically deformed or deflected in the outward directions D12 so that the spring contact legs 156 exert a persistent compressive load (in directions D10) to force the spring contact legs 156 to bear against the contact layers M1, M1'.

More particularly, the spring contact leg 156 of the base contact B1 engages and electrically contacts the input contact layer M1, and the spring contact leg 156 of the base contact 1' engages and electrically contacts the input contact layer M1'. As shown in FIG. 19, the spring contact legs 156 engage the laterally opposed lateral side edges 249A, 249B of the blade connector 242 (which are spaced apart along the lateral axis J2-J2), and apply force in the lateral directions D10. That is, the spring contact legs 156 engage and load the narrow side edges 249A, 249B of the contact layers M1, M1' along an axis parallel to the plane PP of the PCB 234, rather than engaging the broad front and rear faces of the blade connector 242 and applying loads orthogonal to the plane PP of the PCB 234.

The interlocks between the interlock sections 156C and the recesses 249H and the spring loading of the spring contact legs 156 serve to lock the blade connector 242 in the base connector 142. This locking engagement may resist or prevent the SPD module 200 from falling out of the base module 100 due to vibration, etc.

The SPD module 200 can be released and removed from the base module 100 by executing a reverse of the foregoing procedure. It will be appreciated that, in order to remove the SPD module 200 the user must apply a withdrawal force sufficient to deflect the spring contact legs 156 to disengage the interlocks between the base contacts B1, B1', B2, B2', B3, B3' and the blade connectors 242, 244, 246.

The foregoing steps of mounting and removing the SPD module 200 or other suitably configured modules in and from the base module 100 can be repeated multiple times. For example, in the event that an electrical component 252, 254, 256, 258 of the SPD module 200 is degraded or destroyed or no longer of proper specification for the intended application, the SPD module 200 can be replaced with a fresh or suitably constructed module.

The blade connector system 140 has two modes of operation, an SPD module-in mode and an SPD module-out mode. In the SPD module-in mode, the SPD module 200 is mounted on the base module 100 with the blade connectors 242, 244, 246 mated with the base connectors 142, 144, 146 as discussed above and shown in FIGS. 17 and 18. In the SPD module-out mode, the blade connectors 242, 244, 246 are not mated with the base connectors 142, 144, 146, as shown in FIG. 16. Each pair of connectors 142 and 242, 144 and 244, 146 and 246 will operate in the same manner. Accordingly, it will be appreciated that the description below with regard to the connectors 142 and 242 likewise applies to the connectors 144 and 244, 146 and 246.

In the SPD module-in mode, the contact B1 engages the contact M1, and the contact B1' engages the contact M1', as shown in FIG. 18. As a result, the SPD assembly 101 forms a current path E5 (FIG. 18) that extends sequentially through the cable connector C1, the base contact B1, the SPD module contact M1, the SPD module circuit EM, the SPD module contact M1', the base contact B1', and the cable connector C1'. Accordingly, in this configuration the data signal lines L1, L1' are connected and the electrical current travels, via the base module 100, through the SPD module circuit EM to protect the connected lines L1, L1'.

In the SPD module-out mode, the base contacts B1 and B1' engage and electrically contact one another, as shown in FIG. 16. As a result, the base module 100 forms a current path E7 (FIG. 16) that extends sequentially through the cable connector C1, the base contact B1, the base contact B1', and the cable connector C1'. Accordingly, in this configuration the data signal lines L1, L1' are connected and the electrical current travels, via the base module 100, from the cable connector C1 to the cable connector C1', without traveling through the SPD module circuit EM. As a result, the data signal lines L1, L1' will remain electrically connected even when the SPD module 200 is not installed (e.g., when the SPD module 200 is removed for replacement with a new the SPD module 200).

The thermal disconnectors 260 protect the diode 256 and also the resistors 252, 254. Each of the electrical components 252, 254, 256 may become overheated in service. Each thermal disconnector mechanism 260 of the SPD module 200 has two modes of operation depending on the state of the associated electrical component 252, 254, 256, 258. Each thermal disconnector mechanism 260 will operate in the same manner. Accordingly, it will be appreciated that the description below with regard to the electrical component 254 and its thermal disconnector mechanism 260 likewise applies to the other electrical components 252, 256.

During normal operation (referred to herein as Mode 1), the SPD module 200 operates as an overvoltage protected circuit between contact M2 and contact M2'. With reference to FIG. 20, the thermal disconnector mechanism 260 remains in its ready configuration (with the switch member 270 in its ready position). As a result, the current from the base module 100 travels a current path E9 extending sequentially from the base contact B2 to the module contact M2, through the trace T20 from the contact M2 to the pad P6, through the solders S4 and rear conductive layer 276 to the pad P2, through the electrical component 254 to the pad P4, through the trace T26 from the pad P4 to the conductive pin 266B, through the trace T22 from the pin 266B to the contact M2', and through the contact M2' to the base contact B2'. Accordingly, in this configuration the data signal current is routed along a current path through the electrical component 254, and the SPD module 200 operates as an overvoltage protected circuit between connector C2 and connector C2'.

In Mode 2, the thermal disconnector mechanism 260 operates as a fail-safe mechanism and/or indicator actuator mechanism by moving into its actuated configuration. In use, the overvoltage protection component 254 may overheat or generate excessive heat as a result of failure or otherwise. The heat may build up over an extended time period or a relatively brief time period. The heat from the overvoltage protection component 254 is thermally transferred to the solders S4 on the pads P2 and P6. Once sufficient heat has accumulated (a threshold or trigger heat) in the solders S4, the solders S4 will melt, thereby triggering the thermal actuator 262. The melted solders S4 will release the spring-loaded switch member 270, which permits the switch member 270 to translate in the direction D2 under the force of the spring 268 until the front end of the switch member contacts the pins 266A, 266B. The rear conductive layer 276 of the switch member 270 is thereby pulled away from and out of electrical contact with the pads P2 and P6, and the front conductive layer 274 of the switch member 270 is thereby put in electrical contact with the pins 266A, 266B, as shown in FIG. 21.

As a result, the current from the base module 100 travels a current path E11 extending sequentially from the base contact B2 to the module contact M2, through the trace T24 from the module contact M2 to the pin 266A, through the front conductive layer 274 to the pin 266B, through the trace T22 from the pin 266B to the contact M2', and through the contact M2' to the base contact B2'. Accordingly, in this configuration the data signal current is routed through the SPD module 200, but the electrical component 254 is bypassed.

The release of the switch member 270 as described above (by actuation of any of the thermal actuators 262) also actuates the indicator mechanism 280. The displaced switch member 270 pushes the indicator member 282 in the direction D2 from the ready position (FIG. 4) to an alert position. In the alert position, an indicator surface of the indicator member 282 is aligned with and covers or blocks the openings 218, 238C.

In some embodiments, the indicator surface has a noticeably different visual appearance through the windows openings 218, 238C than the housing indicator surface, providing a visual alert or indication so that an operator can readily determine that the alert mechanism has been activated. For example, the housing indicator surface and the indicator member surface may have distinctly different colors (e.g., green versus red). In this manner, the indicator mechanism 280 can provide a convenient indication that the SPD module 200 has assumed a failed state.

In some embodiments, the displaced indicator member 282 blocks the path of an optical beam of an optical monitoring system (e.g., as described below).

The disconnecting mechanism 160 may be used as follows. The operator can position the disconnecting mechanism 160 in each of a connecting position (FIG. 4) and a disconnecting position (FIG. 22).

The disconnecting mechanism 160 is maintained in the connecting position by the spring 168, which pushes the actuator member 166 outward (i.e., in the direction opposite the direction D6) to a ready position. In the ready position, the actuator member 166 permits the spring legs 162C and 164C to engage their respective pins 162A and 162B. As a result, the cable connector C1 is electrically connected to the base contact B1 through the switch 162, and the connector C2 is electrically connected to the base contact B2 through the switch 164.

When desired, the operator can place the disconnecting mechanism 160 in the disconnecting position by pushing (using the handle 166A) the actuator member 166 in the inward direction D6 against the spring 168. The actuator member 166 (via the switch engagement features 166D) forces the spring legs 162C and 164C away from and out of electrical engagement with their respective pins 162A and 162B. As a result, the cable connector C1 is electrically disconnected from the base contact B1 by the open switch 162, and the connector C2 is electrically disconnected from the base contact B2 by the open switch 164.

The actuator member 166 is locked in the disconnecting position by an interlocking engagement between the housing feature 169 and the latch feature 166C. The disconnecting mechanism 160 can be returned to the connecting position by pressing and releasing the actuator member 166.

According to some embodiments and as illustrated, the disconnecting mechanism 160, when placed in the disconnecting position, does not electrically disconnect the cable connector C3 or the cable connector C3' from the base contact B3. According to some embodiments and as illustrated, the disconnecting mechanism 160, when placed in the disconnecting position, also does not electrically disconnect the cable connector C1' from the base contact B1' or the cable connector C2' from the base contact B2'.

The disconnecting mechanism 160 can thus be used to conveniently connect and disconnect the data signal lines L1, L2 at the SPD assembly 101. The operator may wish to disconnect the data signal lines L1, L2 in this manner to make measurements or any other suitable purpose.

Figure 24:
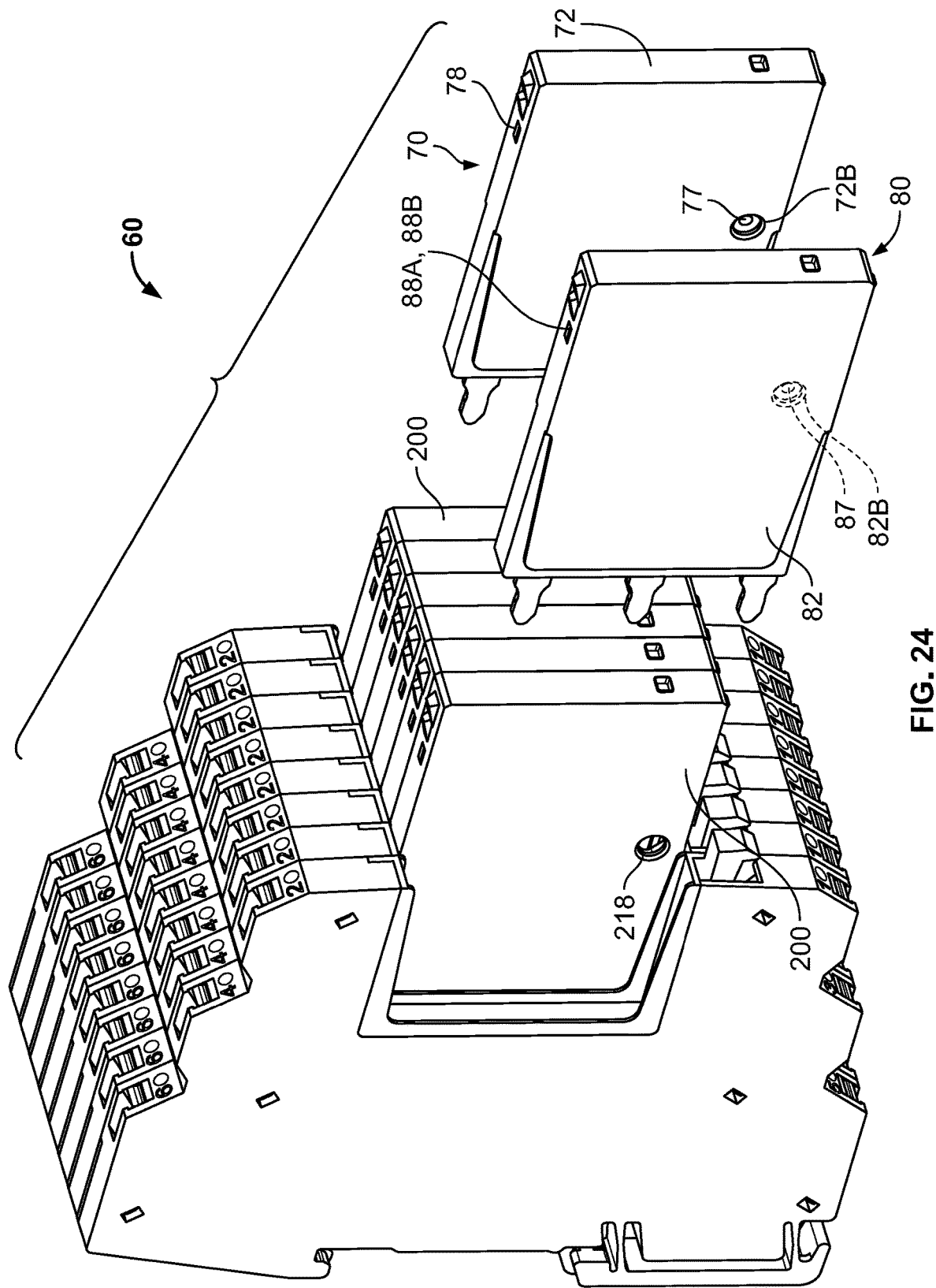
FIG. 24 is an exploded, perspective view of the data signal SPD system of FIG. 23.

SPD assemblies as disclosed herein may be in incorporated into a data signal SPD system that monitors a status of the SPD assembly. For example, and with reference to FIGS. 23-25, a data signal SPD system 60 according to some embodiments includes an optical transmitter module or assembly 70, an optical receiver module or assembly 80, a remote monitoring receiver 64, and one or more of the SPD assemblies 101.

The transmitter assembly 70 includes a housing 72 having a window opening 72B therein. The transmitter assembly 70 further includes a power supply 74, a processor 76 (e.g., a microcontroller), and an optical radiation emitter 77. In some embodiments, the optical radiation emitter 77 is a light emitting diode (LED). In some embodiments, the optical radiation emitter 77 is an infrared (IR) emitter. The transmitter assembly 70 may include an indicator light emitter 78 (e.g., LED) to indicate when the transmitter assembly 70 is emitting light.

The receiver assembly 80 includes a housing 82 having a window opening 82B therein. The receiver assembly 80 further includes a power supply 84, a remote signal transmitter 85 (including remote contacts 85A), a processor 86 (e.g., a microcontroller), and photo sensor 87. In some embodiments, the optical radiation sensor 87 is a phototransistor. In some embodiments, the optical radiation emitter 77 is an infrared (IR) photo sensor. The receiver assembly 80 may include a first indicator light emitter 88A (e.g., LED) to indicate when the receiver assembly 80 is active and receiving light from the optical radiation emitter 77, and a second indicator light emitter 88B (e.g., LED) to indicate when the receiver assembly 80 is active and is not receiving light from the optical radiation emitter 77.

The assemblies 70, 101, 80 are mounted on the DIN rail 40 in series along the axis K1-K1 to form a multiple module SPD assembly 61 including an array of the SPD assemblies 101 with the transmitter assembly 70 and the receiver assembly 80 located on the opposed ends of the stack or array. The window openings 218 of the SPD assemblies 101 are coaxially aligned to form a continuous beam pathway BB. The window openings 72B, 82B face inwardly toward the SPD assemblies 101 and are coaxially aligned with the window openings 218.

In use, the transmitter assembly 70 emits an optical beam B from the emitter 77 along a path toward the photo sensor 87. The processor 86 monitors the signal from the photo sensor 87 to determine whether the optical beam B is incident on the photo sensor 87. When the SPD assemblies 101 are all non-failed, the window openings 218 of the SPD assemblies 101 are not blocked by their indicator members 282 and the optical beam B passes through the window openings 72B, 218, 82B to the photo sensor 87. When an SPD assembly 101 fails, its indicator mechanism 280 is actuated as described above (i.e., by release of a thermal actuator 262), and its deployed indicator member 282 blocks the optical beam B from reaching the photo sensor 87. The processor 86 may send a corresponding failure indication signal to the remote receiver 64 using the remote signal transmitter 85 (via the contacts 85A or wirelessly) and/or provide an alert via the emitter 88B.

The remote receiver 64 may be configured to issue a remote alert responsive to the signal from the remote signal transmitter 85. In some embodiments, all or part of the remote receiver 64 is located remotely from the SPD assembly 61. For example, in some embodiments the remote receiver 64 includes a monitoring circuit or device located in different cabinet, room, building, or facility than the SPD assembly 61. In other embodiments, the remote receiver 64 includes a monitoring circuit or device integrated into the SPD assembly 61. The remote receiver 64 may include a device configured to record or issue an alarm (e.g., visible or audible) in response to the signal from the remote signal transmitter 85 indicating a change in state of the module 100.

Figure 25:
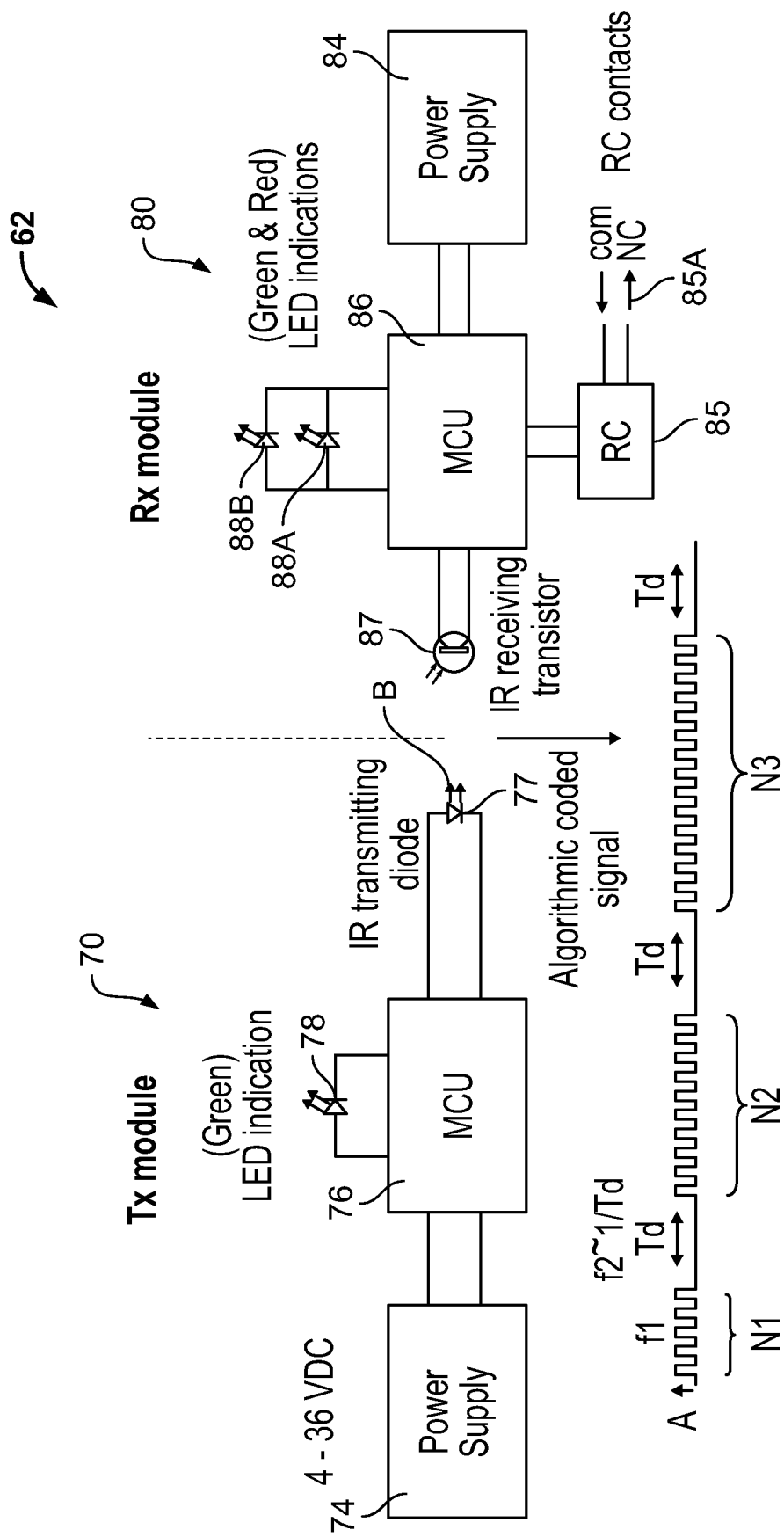
FIG. 25 is a schematic diagram representing the data signal SPD system of FIG. 23.
Figure 28:
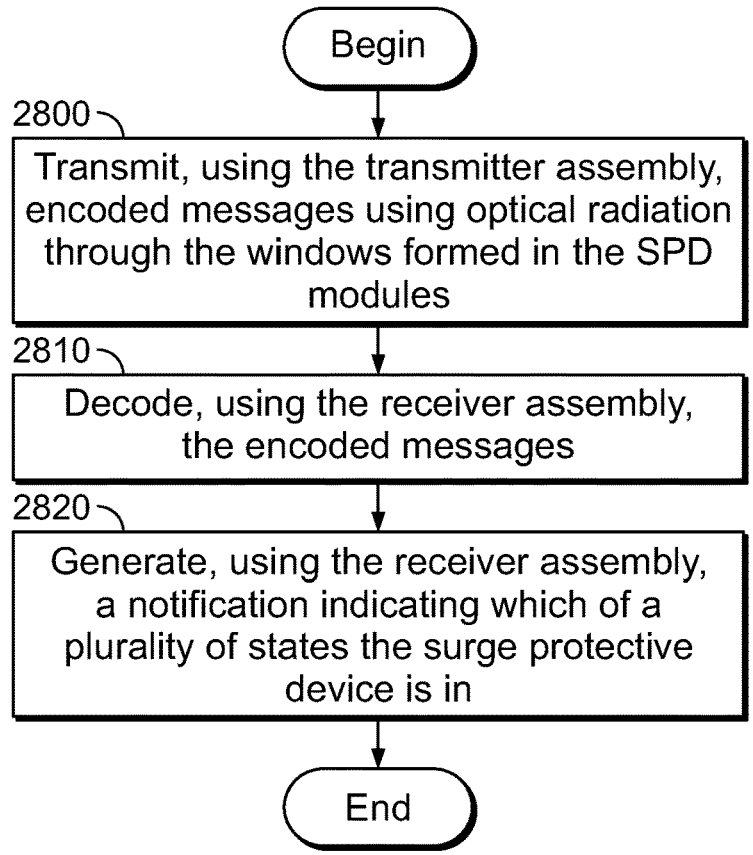
FIGS. 28 and 29 are a flowcharts illustrating operations for detecting activation of one or more SPD modules of an SPD assembly according to some embodiments.
Figure 30:
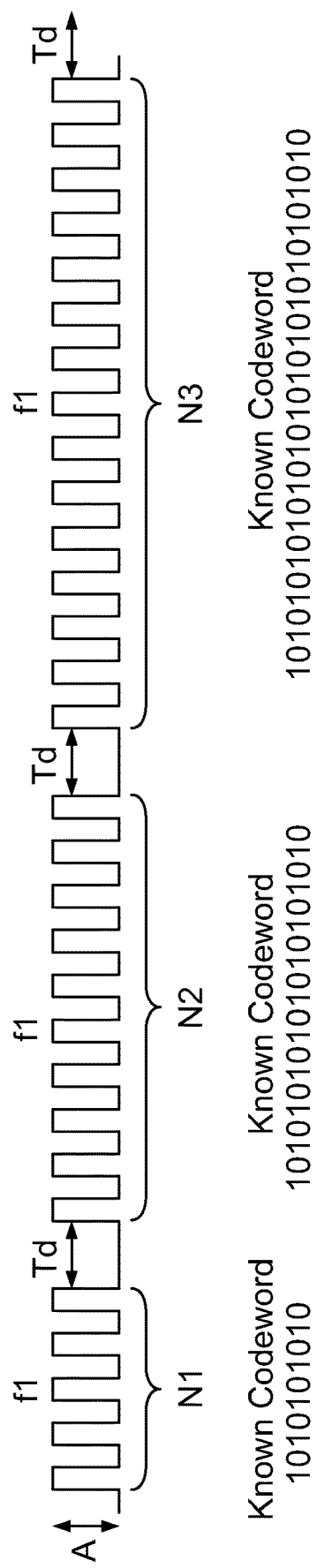
FIG. 30 is a waveform diagram illustrating an optical signal for transmission through windows in one or more SPD modules for detecting activation of one or more of the SPD modules according to some embodiments.

In some embodiments, the transmitter assembly 70 may be configured to transmit an algorithmic coded signal via the optical beam B. Referring now to FIG. 28, operations begin at block 2800 where the transmitter assembly 2800 transmits one or more encoded messages using the optical beam B through the window openings 218 formed in the SPD modules 200. The receiver assembly 80 is configured to decode the one or more encoded messages at block 2810 and, at block 2820, generate a notification or alert via the remote signal transmitter indicating which of a plurality of states the SPD system 60 is in. With reference to FIGS. 25 and 30, the transmitter processor 76 (MCU unit) powers/supplies the IR transmitting diode 77 with a periodical burst square wave signal having an amplitude (A), a main frequency (f1) for the individual bursts, and a secondary burst frequency (f2), which is based on the time delay between the individual bursts. In the example shown in FIGS. 25 and 30, three bursts are used, but it will be understood that one or more bursts may be used according to various embodiments of the inventive concept. The burst packages are separated by the time delay Td (~1/f2) and each burst package has a specified number of pulses (N1, N2, and N3) at the main frequency f1.

Figure 29:
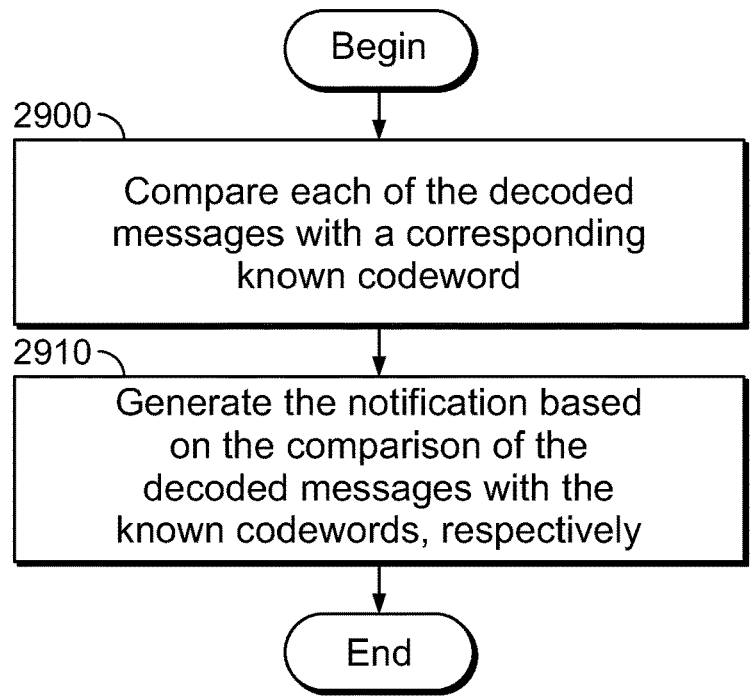

Each pulse or non-pulse in a burst package may represent one bit of message. In the example of FIGS. 25 and 30, the three transmitted messages corresponding to a 10 bit message, a 20 bit message, and a 30 bit message respectively of alternating ones and zeros, i.e., 1010101010, 10101010101010101010, and 101010101010101010101010101010. The transmitter assembly 70 is configured to use the optical radiation emitter 77 to transmit these messages corresponding to known code words, i.e., 10, 20, and 30 bit messages with alternating ones and zeros. Based on the known timing delay between the individual bursts Td and the length of each burst based on the main frequency f1, the receiver assembly 80 may be configured to use the radiation sensor 87 to begin detecting the ones and zeros, i.e., pulses in which the amplitude A of the signal exceeds a threshold and non-pulses, respectively. For each burst package, the message transmitted in the burst package is decoded and the number of one bits in the message is counted and the number of zero bits in the message is counted. Referring now to FIG. 29, each of the decoded messages is compared with a corresponding known codeword at block 2900. This comparison may be performed by determining if the number of one bits and the number of zero bits equal the expected number of one bits and the expected number of zero bits in the known codeword. The notification of the state of the SPD system 60 may be generated at block 2910 based on the comparison of the decoded messages with the known codewords, respectively. Various thresholds of sensitivity may be defined in determining how to determine which state the SPD system 60 is in based on the comparison of the decoded messages with the known codeword. For example, the plurality of states of the SPD system 60 may comprise none of the SPD modules 200 have activated, at least one of the plurality of SPD modules 200 has activated, or secondary optical radiation from a secondary source has penetrated the plurality of window openings 218. As a one bit may be decoded as the successful transmission of light through the window openings 218, a threshold may be set that if a decoded message includes at least 80% of the expected number of one bits as the known codeword, then it will be presumed that none of the SPD modules 200 has activated and the alert or notification may be generated that the SPD system 60 is in a state in which none of the SPD modules 200 has activated. Otherwise, it will be presumed that at least one of the SPD modules 200 has activated due the alert or notification may be generated that the SPD system 60 is in a state in which one or more SPD modules 200 have activated. In the example shown in which three different messages of different bit lengths are used, i.e., three consecutive burst packages, the threshold criterion for determining the state of the SPD system 60 may be applied to each message individually or all three as a group. For example, if any of the three decoded messages fails to include 80% of the expected number of one bits, then it may be presumed that one or more of the SPD modules 200 has activated. In other embodiments, the total number of one bits across all three decoded messages may be summed and compared to the expected number of one bits in the known codewords to and as long as the summed total is at least 80% of the expected number of one bits, then it may be presumed that none of the SPD modules 200 has activated; otherwise, it will be presumed that one or more of the SPD modules 200 has activated. While some embodiments have been described by way of example with respect to counting the expected number of one bits in a decoded message for a burst package, it may be more generally described as comparing decoded message(s) with their respective known codeword (s) and determining the number of bits that differ and the number of bits that correspond to each other. If the number of bits that correspond to each other exceeds a defined threshold, then it may be presumed that none of the SPD modules 200 has activated; otherwise, it may be presumed that at least one of the SPD modules 200 has activated. This threshold may be applied to the decoded message for each burst package individually with a decision on the state of the SPD system 60 made based on this one message or, in other embodiments, the threshold may be applied across multiple messages corresponding to multiple burst packages and the threshold applied to the total matching bits and differing bits with known codewords across all messages.

As described above, in some embodiments, the presence of radiation may be decoded at the receiver assembly 80 via the optical radiation sensor 87 as a one bit. In some environments, optical radiation from an external source, e.g, ambient lighting from a room and/or the sun may penetrate the SPD system 60 and result in messages for the individual burst packages being decoded with excessive numbers of one bit. For example, instead of a 10-bit burst package message having five ones and five zeros, the message may be decoded as 1111111011. An IR light penetration threshold, which may be termed a repeating bit threshold, may be defined and if the number of consecutive one bits exceeds this threshold, then it may be determined that the SPD system 60 is in a state in which optical radiation from a secondary source has penetrated the plurality of window openings 218 and a notification or alert generated accordingly. This repeating bit threshold may be set in consideration of the known codewords transmitted by the transmitter assembly 70. For example, if the known codewords include multiple intervals of many consecutive one bits, then the repeating bit threshold for detecting optical radiation from a secondary source may be set relatively high. In the example of FIGS. 25 and 29 in which the known codewords are 10, 20, and 30 bit bursts of alternating ones and zeros, the repeating bit threshold may be set relatively low, such as four consecutive one bits.

The main frequency f1 and the delay between burst packages may be set to avoid false alerts or notifications due to vibration noise. The long duration of the individual pulses for the bits and the generally high number of bits may reduce the number of false alerts or notification due to vibration noise. In some embodiments, the values are in the following ranges: amplitude A (5-10V); Frequency f1 (10-100 Hz); Bit rate (20-200 bps); Frequency f2 (0.2-20 Hz); Time delay Td (2-10 seconds); and Number of bits N1, N2, N3 (10-100 bits). In some embodiments, the number of bits in successive burst packages may increase, such that the number of bits in each burst package may be given by N1, N2=2N1, and N3=3N1. When the frequency f1 is 20 Hz, the bit rate may be 40 bps.

The receiver processor 86 (MCU unit) measures the voltage signal on the receiver's IR receiving transistors 87 and decodes the received signal by evaluating the signal amplitude, frequency and number of pulses in consecutive bursts. If specific/required criterions are not met, which will occur if one or multiple SPD modules in the array reach their failed or end-of-life state closing the light tunnel or path through the SPD module, the receiver unit 80 will signalize the failed/end-of-life state of the SPD via a remote alert via the transmitter 85 and the LED 88B. Such a signal coding and decoding is implemented in order to prevent false end-of-life indication, which may happen during the installation of the SPD, external IR disturbances, vibrations etc.

Figure 26:
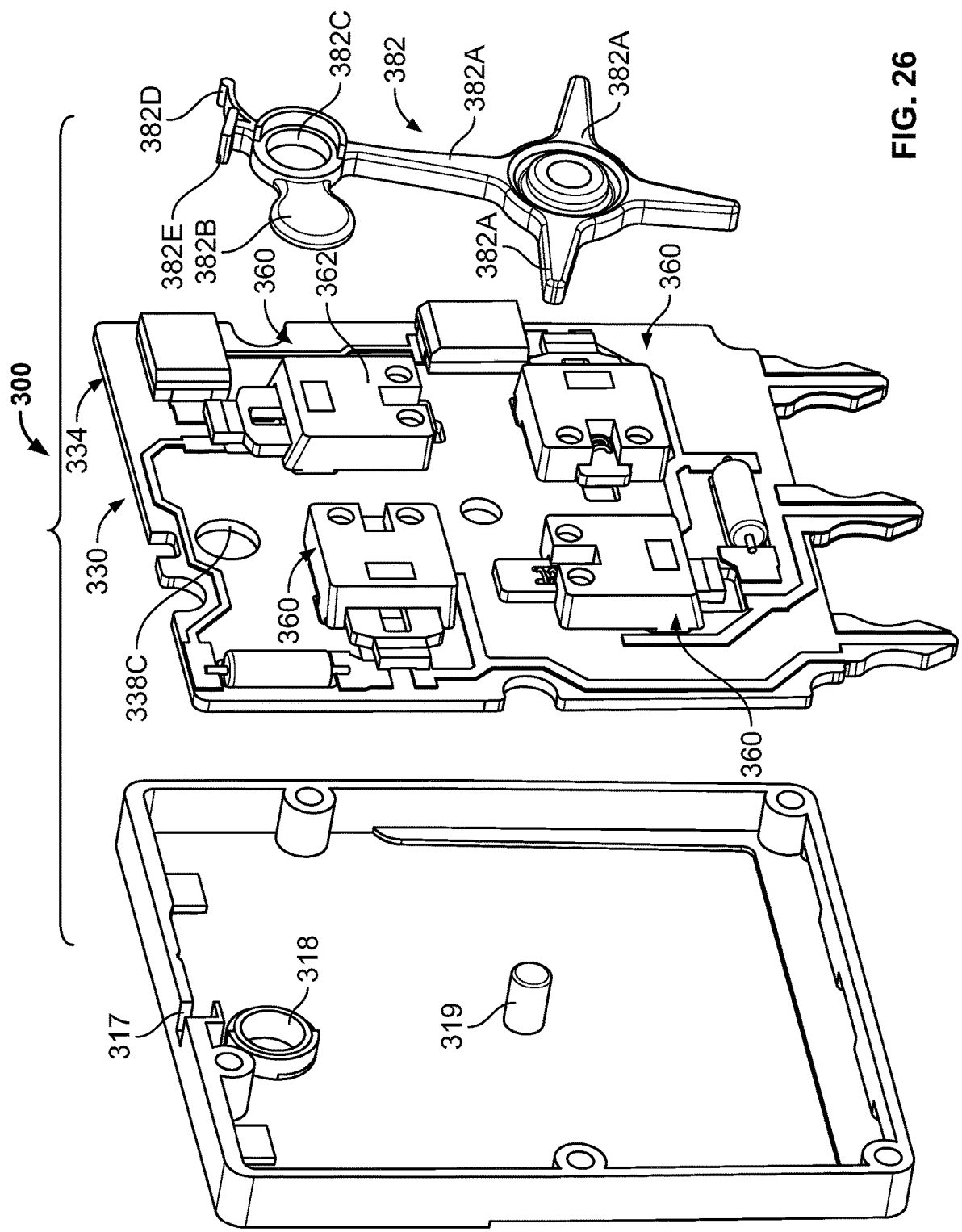
FIG. 26 is an exploded, fragmentary, perspective view of an SPD module according to further embodiments.
Figure 27:
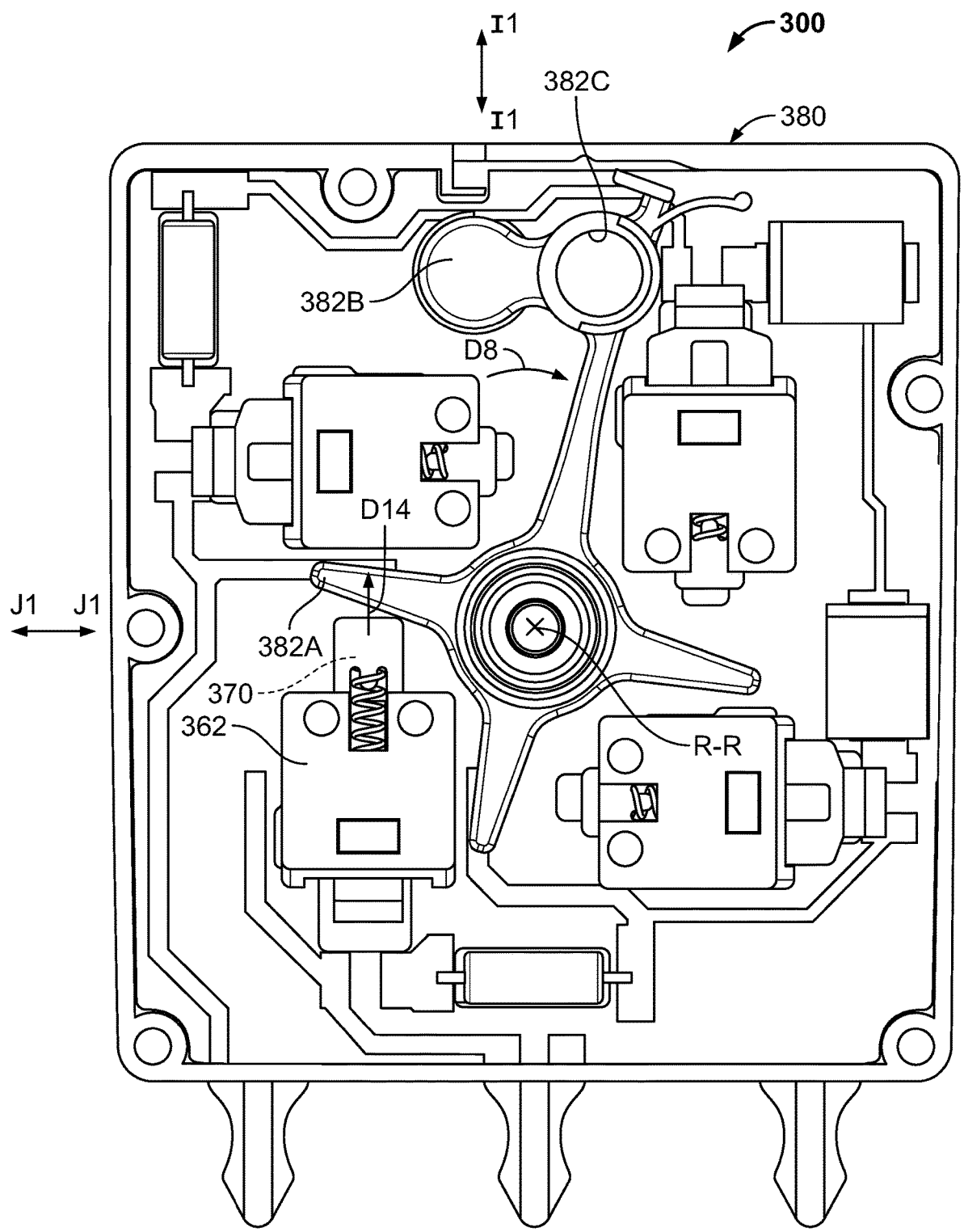
FIG. 27 is a fragmentary, side view of the SPD module of FIG. 26.

With reference to FIGS. 26 and 27, an SPD module 300 according to further embodiments is shown therein. The SPD module 300 can be used in place of the SPD module 200 in the SPD assembly 101. The SPD module 300 may be constructed and operate in the same manner as of the SPD module 200, except as follows.

The SPD module 300 includes an electrical assembly 330, a PCB 334, and overvoltage protection components 352, 354, 356, 358 corresponding to the electrical assembly 330, the PCB 334, and the components 352, 354, 356. The SPD module 300 includes a rotating indicator mechanism 380 in place of the translating indicator mechanism 280. The SPD module 300 includes four thermal actuators 360 corresponding to the thermal actuators 260. The electrical assembly 330 includes traces, pads, and solders corresponding to those of the SPD module 200 to mechanically and electrically connect the thermal actuators 260 and the overvoltage protection components 352, 354, 356, 358 as discussed for the SPD module 200. The thermal actuators 362, electrical components, traces, pads, and solders are reconfigured as compared to those of the SPD module 200 to accommodate the movement of the rotating indicator mechanism 380.

The rotating indicator mechanism 380 includes an indicator member 382, an opening 338C in the PCB 334, openings 318 in the side walls of the module housing, an indicator window 317 in the front of the housing, and a rotation post 319, which may be integrally formed with the housing. The indicator member 382 includes four actuation legs 382A, a shutter portion 382B, an opening 382C, a retainer feature 382D, and an indicator portion 382E.

The indicator member 382 is mounted on the post 319 to rotate about an axis R-R. The axis R-R is perpendicular to each of the PCB fore-aft axis I1-I1 and the PCB lateral axis J1-J1.

In a ready position, the opening 382C is aligned with the openings 318, 338C and each leg 382A is disposed adjacent the front end of the switch member 370 of a respective one of the thermal actuators 362. The retainer feature 382D engages the housing 310 to retain the indicator member 382 in the ready position.

When a thermal disconnector mechanism 360 is triggered, the thermal actuator 362 thereof is actuated so that its spring-loaded switch member 370 is released in the direction D14 and forces the indicator member 382 to rotate in a direction D8 to an indicating position as shown in FIG. 27. The closure of the light path through the openings 318, 338C can be used to enable optical monitoring as described herein with regard to the SPD assembly 101 and the SPD system 60. In the indicating position, the shutter portion 382B covers or blocks the openings 318, 338C. Additionally, the indicator portion 382E is relocated away from the indicator window 317 to provide a local alert.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

It will be understood that, although the terms "first," "second," etc. may be used herein to describe various elements, these elements should not be limited by these terms. These terms are only used to distinguish one element from another. Thus, a first element could be termed a second element without departing from the teachings of the inventive subject matter.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims, therefore, are to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed is:

1. A surge protective device (SPD) assembly comprising:
a base module; and
an SPD module configured to be mounted on the base module, the SPD module comprising:
   an SPD module printed circuit board (PCB);
   an SPD module circuit at least partly embodied in the SPD module PCB and including an overvoltage protection component mounted on the SPD module PCB; and
   a thermal disconnector mechanism mounted on the SPD module PCB, the thermal disconnector mechanism operative to transition from a ready configuration to an actuated configuration responsive to sufficient overheating of the overvoltage protection component, the thermal disconnector mechanism comprising:
      first and second electrically conductive bypass contacts mounted on the SPD module PCB and connected to the SPD module circuit; and
      a switch member movable from a ready position to a displaced position to thereby transition the thermal disconnector mechanism from the ready configuration to the actuated configuration, the switch member comprising an electrically conductive portion;
   wherein in the ready configuration, the electrically conductive portion does not electrically connect the first and second bypass contacts and the SPD module circuit forms a first current path through the overvoltage protection component;
   wherein in the actuated configuration, the thermal disconnector mechanism forms an alternate second current path that bypasses the overvoltage protection component; and,
   wherein when the switch member is in the displaced position and the thermal disconnector mechanism is in the actuated configuration, the electrically conductive portion contacts and electrically connects the first and second bypass contacts to form the alternate second current path through the electrically conductive portion and the first and second bypass contacts.

2. The SPD assembly of claim 1 wherein the first bypass contact is an electrically conductive first pin mounted on the SPD module PCB, and the second bypass contact is an electrically conductive second pin mounted on the SPD module PCB.

3. The SPD assembly of claim 1 wherein:
the switch member includes a body formed of an electrically insulating material; and
the electrically conductive portion is a layer of an electrically conductive material.

4. The SPD assembly of claim 1 wherein:
the SPD module circuit includes first and second contact pads on the SPD module PCB;
the switch member includes a second electrically conductive portion and the switch member is held in the ready position by solder
located on the first and second contact pads and securing the second electrically conductive portion to the first and second contact pads, the solder configured to be melted by heat from the overvoltage protection component to thereby release the switch member into the displaced position; and the second electrically conductive portion electrically connects the first and second contact pads when the thermal disconnector mechanism is in the ready configuration and does not electrically connect the first and second contact pads when the thermal disconnector mechanism is in the actuated configuration.

5. The SPD assembly of claim 1 wherein:
the SPD module includes a displaceable indicator member;
displacement of the switch member from the ready position to the displaced position forces the indicator member to translate from a ready position to an indicating position.

6. The SPD assembly of claim 1 wherein:
the base module comprises:
 a base module housing;
 an input cable connector and an output cable connector on the housing;
 at least one base connector on the housing; and
 a base module circuit electrically connecting the input cable connector to the output cable connector, and electrically connecting the input cable connector and the output cable connector to the at least one base connector;
wherein:
 the SPD module is configured to be mounted on the base module, the SPD module including:
  an SPD module housing; and
  at least one SPD module connector configured to electrically contact the at least one base connector when the SPD module is mounted on the base module and to thereby electrically connect the base module circuit to the SPD module circuit to form an SPD circuit;
 the first current path extends from the input cable connector to the output cable connector through the overvoltage protection component; and
 the second current path extends from the input cable connector to the output cable connector through the SPD module circuit and bypasses the overvoltage protection component.

7. The SPD assembly of claim 6 wherein:
the base module includes a disconnecting mechanism including an actuator member
selectively operable by a user to electrically disconnect the input cable connector from the output cable connector.

8. The SPD assembly of claim 6 wherein the at least one SPD module connector includes a blade connector.

9. The SPD assembly of claim 8 wherein:
the at least one base connector includes first and second opposed base spring contacts;
the blade connector has a first side edge and a laterally opposing second side edge, wherein the first and second side edges are spaced apart along a lateral axis;
the blade connector includes:
 a blade tab forming a part of the SPD module PCB;
 a first electrical contact layer disposed on the blade tab along the first side edge; and
 a second electrical contact layer on the blade tab along the second side edge; and
the at least one base connector is configured to receive the blade connector such that the first and second base spring contacts engage the first and second electrical contact layers, respectively, and load the first and second side edges along the lateral axis.

10. The SPD assembly of claim 9 wherein:
the first base contact is a spring contact; and
when the blade connector is received in the base connector, the spring contact is elastically deflected and applies a load against the first side edge along the lateral axis, wherein the base connector is configured such that the first and second base contacts electrically engage one another when the blade connector is not installed in the base connector.

11. The SPD assembly of claim 9 wherein the first and second base contacts and the blade connector include cooperating interlock features that mechanically resist removal of the blade connector from the base connector.

12. A surge protective device (SPD) module comprising:
an SPD module printed circuit board (PCB);
an SPD module circuit at least partly embodied in the SPD module PCB and including an overvoltage protection component mounted on the SPD module PCB; and
a thermal disconnector mechanism mounted on the SPD module PCB, the thermal disconnector mechanism operative to transition from a ready configuration to an actuated configuration responsive to sufficient overheating of the overvoltage protection component, the thermal disconnector mechanism comprising:
 first and second electrically conductive bypass contacts mounted on the SPD module PCB and connected to the SPD module circuit; and
 a switch member movable from a ready position to a displaced position to thereby transition the thermal disconnector mechanism from the ready configuration to the actuated configuration, the switch member comprising an electrically conductive portion;
wherein in the ready configuration, the electrically conductive portion does not electrically connect the first and second bypass contacts and the SPD module circuit forms a first current path through the overvoltage protection component;
wherein in the actuated configuration, the thermal disconnector mechanism forms an alternate second current path that bypasses the overvoltage protection component; and,
wherein when the switch member is in the displaced position and the thermal disconnector mechanism is in the actuated configuration, the electrically conductive portion contacts and electrically connects the first and second bypass contacts to form the alternate second current path through the electrically conductive portion and the first and second bypass contacts.

13. The SPD module of claim 12 wherein the first bypass contact is an electrically conductive first pin mounted on the SPD module PCB, and the second bypass contact is an electrically conductive second pin mounted on the SPD module PCB.

14. The SPD module of claim 12 wherein:
the switch member includes a body formed of an electrically insulating material; and
the electrically conductive portion is a layer of an electrically conductive material.

15. The SPD module of claim 12 wherein:
the SPD module circuit includes first and second contact pads on the SPD module PCB;
the switch member includes a second electrically conductive portion and the switch member is held in the ready position by solder located on the first and second contact pads and securing the second electrically conductive portion to the first and second contact pads, the solder configured to be melted by heat from the overvoltage protection component to thereby release the switch member into the displaced position; and the second electrically conductive portion electrically connects the first and second contact pads when the thermal disconnector mechanism is in the ready configuration and does not electrically connect the first and second contact pads when the thermal disconnector mechanism is in the actuated configuration.

16. The SPD module of claim 12 wherein:

the SPD module includes a displaceable indicator member; displacement of the switch member from the ready position to the displaced position forces the indicator member to translate from a ready position to an indicating position.

17. A surge protective device (SPD) assembly comprising:
 a base module comprising:
  a base module housing;
  an input cable connector and an output cable connector on the base module housing;
  at least one base connector on the base module housing; and
  a base module circuit electrically connecting the input cable connector to the output cable connector, and electrically connecting the input cable connector and the output cable connector to the at least one base connector; and
 an SPD module configured to be mounted on the base module, the SPD module comprising:
  an SPD module housing;
  an SPD module printed circuit board (PCB);
  an SPD module circuit at least partly embodied in the SPD module PCB and including an overvoltage protection component mounted on the SPD module PCB;
  at least one SPD module connector configured to electrically contact the at least one base connector when the SPD module is mounted on the base module and to thereby electrically connect the base module circuit to the SPD module circuit to form an SPD circuit; and
  a thermal disconnector mechanism mounted on the SPD module PCB;
 wherein:
  the thermal disconnector mechanism is operative to transition from a ready configuration to an actuated configuration responsive to sufficient overheating of the overvoltage protection component;
  when the thermal disconnector mechanism is in the ready configuration, the SPD circuit forms a first current path through the overvoltage protection component;
  when the thermal disconnector mechanism is in the actuated configuration, the thermal disconnector mechanism forms an alternate second current path that bypasses the overvoltage protection component;
  the first current path extends from the input cable connector to the output cable connector through the overvoltage protection component; and
  the second current path extends from the input cable connector to the output cable connector through the SPD module circuit and bypasses the overvoltage protection component.

18. The SPD assembly of claim 17 wherein:
the base module includes a disconnecting mechanism including an actuator member; and
the actuator member is selectively operable by a user to electrically disconnect the input cable connector from the output cable connector.

19. The SPD assembly of claim 17 wherein:
the at least one base connector includes first and second opposed base spring contacts; and,
the at least one SPD module connector includes a blade connector having a first side edge and a laterally opposing second side edge, wherein the first and second side edges are spaced apart along a lateral axis;
the blade connector includes:
 a blade tab forming a part of the SPD module PCB;
 a first electrical contact layer disposed on the blade tab along the first side edge; and
 a second electrical contact layer on the blade tab along the second side edge; and
the at least one base connector is configured to receive the blade connector such that the first and second base spring contacts engage the first and second electrical contact layers, respectively, and load the first and second side edges along the lateral axis.

20. The SPD assembly of claim 19 wherein:
the first base contact is a spring contact; and
when the blade connector is received in the base connector, the spring contact is elastically deflected and applies a load against the first side edge along the lateral axis wherein the base connector is configured such that the first and second base contacts electrically engage one another when blade connector is not installed in the base connector.

* * * * *